United States Patent
Okada et al.

(10) Patent No.: US 8,699,065 B2
(45) Date of Patent: Apr. 15, 2014

(54) DISPLAY OPERATION DEVICE ALLOCATING A PLURALITY OF FUNCTIONS TO A KEY, IMAGE PROCESSING APPARATUS, AND METHOD OF RECEIVING USER OPERATIONS

(75) Inventors: Mikiya Okada, Osaka (JP); Naohiro Andoh, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 443 days.

(21) Appl. No.: 13/185,904

(22) Filed: Jul. 19, 2011

(65) Prior Publication Data

US 2012/0019861 A1    Jan. 26, 2012

(30) Foreign Application Priority Data

Jul. 22, 2010 (JP) ................. 2010-164731

(51) Int. Cl.
*G06F 3/12* (2006.01)

(52) U.S. Cl.
USPC .......... 358/1.15; 345/1.1; 345/1.13; 345/619; 399/8; 399/13; 399/18

(58) Field of Classification Search
CPC ....................................... G06F 3/12
USPC ................................. 358/1.1–3.29
See application file for complete search history.

(56) References Cited

U.S. PATENT DOCUMENTS

| | | | |
|---|---|---|---|
| 4,597,662 A | 7/1986 | Hirata et al. | |
| 2006/0275064 A1* | 12/2006 | Minari | 399/366 |
| 2008/0065622 A1 | 3/2008 | Goto et al. | |
| 2009/0110365 A1 | 4/2009 | Osaki et al. | |
| 2009/0290849 A1 | 11/2009 | Ohtake et al. | |
| 2009/0303557 A1 | 12/2009 | Nishimura | |
| 2010/0027059 A1 | 2/2010 | Ebi | |

FOREIGN PATENT DOCUMENTS

| | | | | |
|---|---|---|---|---|
| JP | 59-58457 | * | 4/1984 | ............ G03G 15/00 |
| JP | 59-058457 U | | 4/1984 | |
| JP | 59-140463 | * | 8/1984 | ............ G03G 15/00 |
| JP | 59-140463 A | | 8/1984 | |
| JP | 10-105001 A | | 4/1998 | |
| JP | 10-312261 A | | 11/1998 | |
| JP | 2005-064944 A | | 3/2005 | |

(Continued)

OTHER PUBLICATIONS

An Office Action issued in a corresponding U.S. Appl. No. 13/178,875, dated Dec. 13, 2012.

(Continued)

*Primary Examiner* — Benny Q Tieu
*Assistant Examiner* — Marcellus Augustin
(74) *Attorney, Agent, or Firm* — Edwards Wildman Palmer LLP; David G. Cohn; Edmund J. Koundakjian

(57) ABSTRACT

A display operation device has a display-integrated operation panel with a display screen, on which a monochrome copy start key and a color copy start key are displayed. When black-toner-out or color-toner-out occurs, on the monochrome copy start key and the color copy start key, another UI component such as black-toner-out key and color-toner-out key is displayed. Such a UI component is displayed at the display position of the monochrome copy start key and the color copy start key, being superposed on these keys.

13 Claims, 16 Drawing Sheets

(56) References Cited

FOREIGN PATENT DOCUMENTS

| | | |
|---|---|---|
| JP | 2006-146729 A | 6/2006 |
| JP | 2009-111628 A | 5/2009 |
| JP | 2009-278548 A | 11/2009 |
| JP | 2010-026592 A | 2/2010 |
| WO | WO-2010/107009 A1 | 9/2010 |

OTHER PUBLICATIONS

Office Action issued on Jul. 2, 2013 in related U.S. Appl. No. 13/178,875.

A Notice of Allowance issued on Sep. 27, 2013 in U.S. Appl. No. 13/178,875.

\* cited by examiner

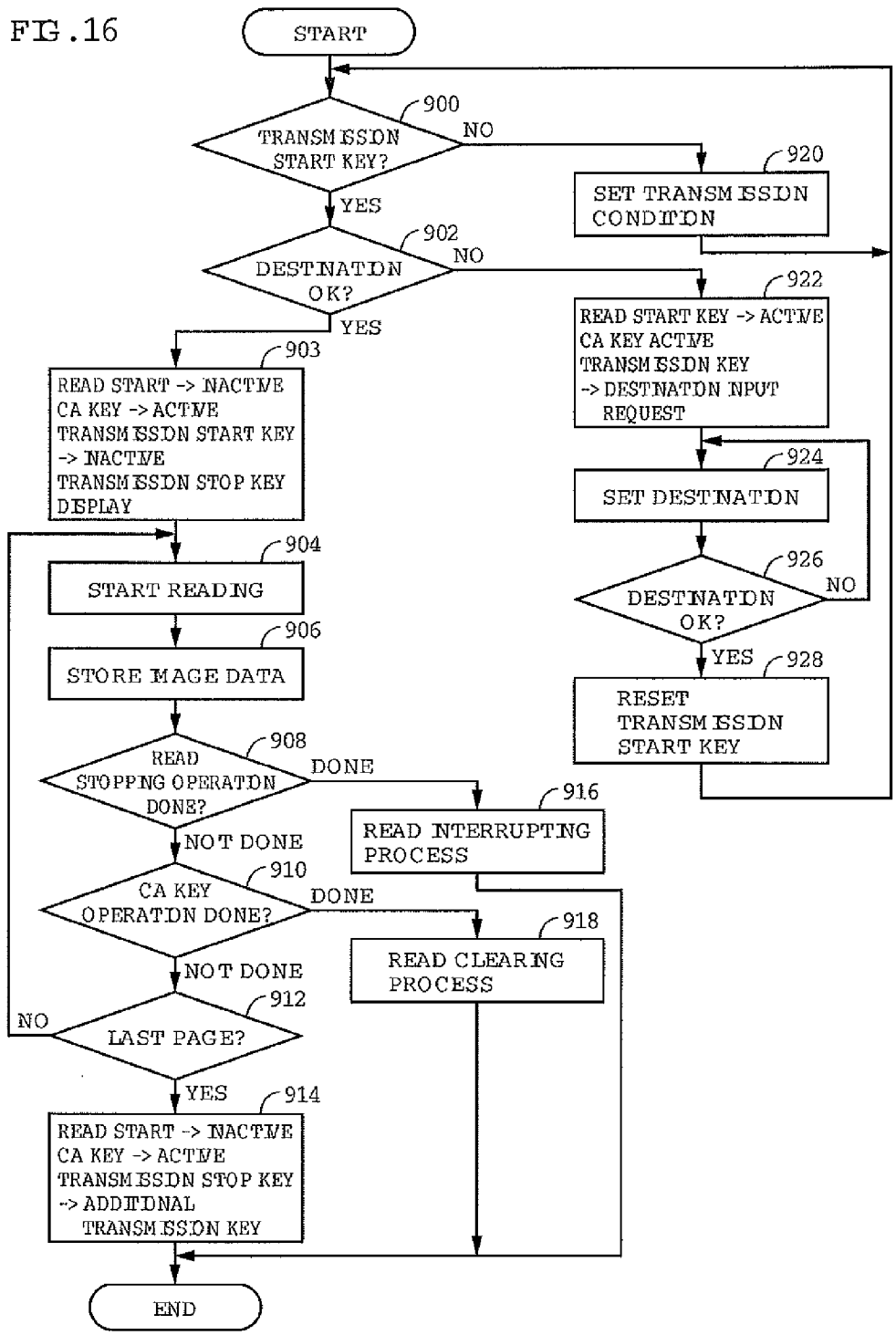

DISPLAY OPERATION DEVICE ALLOCATING A PLURALITY OF FUNCTIONS TO A KEY, IMAGE PROCESSING APPARATUS, AND METHOD OF RECEIVING USER OPERATIONS

CROSS-REFERENCE TO RELATED APPLICATION

This nonprovisional application claims priority under 35 U.S.C. §119(a) on Patent Application No. 2010-164731 filed in Japan on Jul. 22, 2010, the entire contents of which are hereby incorporated by reference.

BACKGROUND OF THE INVENTION

1. Field of the Invention

The present invention relates to a display operation device for giving an instruction to electronic equipment and, more specifically, to a display device receiving a user instruction using a user interface (UI) component such as a software key as a trigger of some process, as well as to an image processing apparatus having such a display operation device.

2. Description of the Background Art

As one type of image processing apparatuses as electronic equipment, image forming apparatuses (typically, copy machines) are introduced to many places of business (companies and offices). A main function of an image forming apparatus is to form an image on a sheet of recording paper. Therefore, it is often the case that the image forming apparatus has a printer function, a copy function and the like. The image forming apparatuses are often connected to a network, to allow use by a plurality of users. A multifunction peripheral (MFP) has been known as one type of such image forming apparatuses. An MFP has a scanner function, and has a plurality of basic operational modes such as a copy mode, a facsimile mode (hereinafter "facsimile" may also be denoted as FAX), and a network-supported printer mode. It is expected that the scanner function will be used more frequently in the future in such image forming apparatuses. In the copy mode and facsimile mode also, it is possible to read an image using the scanner function and to set functions such as duplex (two-sided) printing, collective printing (such as 2-in-1 by which two pages of an original document are printed on one sheet, or 4-in-1 by which four pages of an original document are printed on one sheet), and enlargement or reduction of size.

When using such an image forming apparatus, by way of example, the user makes the following operations. First, the user has image data read by the image forming apparatus in the scanner mode. Thereafter, the user inputs various instructions through an operation panel, and performs image processing (such as collection). Then, the user gives an instruction to start a final processing of the image (printing to a sheet of paper, transmission by facsimile, and saving as a file). A screen image allowing setting of functions in various operational modes, for example, is displayed on the operation panel. Therefore, it is possible for the user to easily set various functions.

Recently, a touch-panel display comes to be increasingly used as such an operation panel. A touch-panel display includes a liquid crystal panel (display panel) and a touch-panel stacked on the liquid crystal panel. Typically, items (software keys) allowing selection of an operational mode of the image forming apparatus are displayed on the touch-panel display. Viewing the display, the user presses a position where a desired item is displayed, on the touch-panel display. For the user, it seems as if he/she has pressed a software key. Information related to which position has been pressed is transmitted to a computer controlling the image forming apparatus, and what operation is to be carried out is determined in accordance with the position, by a program running on the computer.

The touch-panel display provides both the display function and the operation function. It is advantageous in that it occupies a smaller area for installation than a display unit and an operation unit provided separately, it allows various and many manners of display, and it provides various and many functions.

By way of example, when an MFP having a touch-panel display as such as an operation panel is in the copy mode, a copy start key (button) is displayed on the display as an initial screen image. If the copy start key is pressed, using this as a trigger, the MFP automatically reads a document placed on an automatic document reader and forms a copy on a sheet of recording paper.

After the start of copying, it may be desired to stop copying by some reason. For this purpose, it is a general practice to display a copy stop key together with the copy start key, so that copying can by stopped by pressing the copy stop key once the copying operation is started. However, displaying the copy stop key together with the copy start key hinders efficient use of the area of touch-panel display. Considering the fact that MFPs come to have various and many functions, many pieces of information must be displayed on the display, and such pieces of information must be displayed in an easily viewable and easily understandable manner. Therefore, the area of touch-panel display should not be wasted.

In order to solve such a problem, Japanese Utility Model Laying-Open Application No. 59-58457 (hereinafter referred to as '457 Reference), which will be described later, discloses a technique of using one switch both as a copy start switch and a copy stop switch. Specifically, '457 Reference discloses a technique in which during a copy operation, the copy start key is used as a copy stop key. In the device disclosed in this reference, either one of two character strings "START" and "STOP" lights up on a hardware key. The character string corresponding to the usable function lights up on the key.

On the other hand, in the MFP, various problems may occur in connection with so-called supplies, including paper-out, toner-out and paper jam. Japanese Patent Laying-Open No. 59-140463 (hereinafter referred to as '463 Reference) discloses a copy function operation device, in which a plurality of icons representing the state of copying machine (such as paper-out, toner-out and paper jam) at the time of copying, on a copy start button for starting copying.

The technique described in '457 Reference and the technique described in '463 Reference are based on similar ideas of allocating different functions to one key or button and switching the functions to be used. These are good techniques that allow advantageous use of the display area.

These techniques, however, still have room for improvement, in connection with the MFP using a touch-panel as described above as an operating device. It is often the case that keys for instructing execution of various and many functions are displayed on the touch-panel. In such an MFP, introduction of the technique disclosed in '457 and '463 References may lead to the following problem, Specifically, in such an MFP, execution instruction key is provided for each of the plurality of functions. Then, combination of a position where a key instructing execution of a function is displayed and a position where a key for executing a process related to the key are displayed, or a position where a piece of information related to the key is displayed becomes complicated. Consequently, if problems occur, it could be difficult for the user to respond quickly to solve the problem,

SUMMARY OF THE INVENTION

Therefore, it is desirable to provide a display operation device having a function of a touch-panel or the like, allowing, in relation to various and many functions, easy and immediate recognition of a problem related to any of the functions or of a process necessary for executing the function, as well as to provide an image processing apparatus having such a display operation device.

According to a first aspect, the present invention provides a display operation device, including: a display-integrated operation panel having a display screen; a first UI component display device displaying a first user interface (UI) component image on the display screen; a process activating device, responsive to a user operation of the first UI component displayed on the display screen by the first UI component display device, for activating a process associated with the first UI component; and a second UI component display device, responsive to occurrence of a predetermined condition related to the process activated in association with the first UI component by the process activating device, for displaying a second UI component on the display screen. The second UI component is displayed at a position of display of the first UI component, to cover the first UI component.

When execution of a certain process starts in response to an operation of the first UI component and a condition related to the process occurs, the second UI component is displayed at the display position of the first UI component, to be superposed on the first UI component. The second UI component is easily viewable to the user, even if the user does not change his/her point of view. Therefore, viewing the second UI component, the user can immediately execute a process to cope with the condition that has occurred or recognize the condition. It becomes easier for the user to grasp situations surrounding the process related to the first UI component, and operability is improved.

As a result, a display operation device allowing, in relation to various and many functions, easy and immediate recognition of a problem related to any of the functions or of a process necessary for executing the function can be provided.

Preferably, the second UI component display device includes a device responsive to activation of a process associated with the first UI component by the process activating device, for displaying the second UI component at the position of the first UI component on the display screen. The operation display device further includes stopping device, responsive to a user operation of the second UI component, for stopping execution of the process activated by the process activating device.

By operating the second UI component, it is possible to stop the process started by the operation of the first UI component. Since the second UI component is displayed at the same position as the first UI component, if it becomes necessary to stop the process started by the operation of the first UI component by some reason, the process can immediately be stopped by operating the second UI component.

More preferably, the second UI component display device includes a disabling device, detecting occurrence of an event hindering the process to be activated by the process activating device, for displaying the second UI component at the same position as the first UI component, to be superposed on the first UI component, and thereby for disabling user operation of the first UI component.

If any event that will hinder the process activated by the process activating device occurs, the second UI component is displayed at the same position as the first UI component and, therefore, it is possible for the user to easily understand the occurrence of hindrance and to cope with it. Since operation of the first UI component is disabled, any problem caused by the hindrance can be prevented.

More preferably, the display operation device is mounted on an image processing apparatus involving toner use. The first UI component is a device for displaying an image formation start key for activating a process for forming an image using the toner. The disabling device includes a toner-out detecting device detecting shortage of toner to be used for image formation by the image forming apparatus, and a replenishment message display device, responsive to detection of toner-out by the toner-out detecting device, for displaying a message asking replenishment of toner, as the second UI component.

When toner-out is detected at the time of image formation using toner, a message asking toner replenishment is displayed as the second UI component. Since the toner can be replenished before starting image formation, smooth operation becomes possible.

The toner-out detecting device may include a device for separately detecting black-toner-out and color-toner-out. The replenishment message display device may include a toner-by-toner message display device, responsive to detection of one of or both of black-toner-out and color-toner-out by the toner-out detecting device, for displaying a message asking replenishment of black toner, replenishment of color toner or replenishment of black toner and color toner, as the second UI component.

By the second UI component, whether black or color toner is to be replenished is displayed. Therefore, smooth operation becomes possible.

Preferably, the first UI component includes a first key instructing start of image formation using black toner, and a second key instructing start of image formation using color toner. The toner-by-toner message display device displays a key including the message asking replenishment of toner, on the first key if black-toner-out is detected and on the second key if color-toner-out is detected.

By the second UI component, whether black or color toner is to be replenished is displayed. Further, if the black toner is in short supply while the color toner is available, it is possible to instruct start of image formation using the color toner. The user can easily understand that without black toner, image formation only by the color toner is possible and, hence, the user can make an appropriate operation.

More preferably, the display operation device is mounted on an image processing apparatus involving use of a recording medium. The first UI component display device is a device for displaying an image formation start key for activating a process for image formation on the recording medium. The disabling device includes a trouble detecting device detecting a trouble occurring in relation to supply of the recording medium of the image processing apparatus, and a trouble-solution message display device, responsive to detection of a trouble by the trouble detecting device, for displaying a message asking a solution to the problem, as the second UI component.

If any trouble related to the recording medium occurs, a message asking a solution to the trouble is displayed as the second UI component, at the position of the first UI component. It is possible for the user to easily understand the occurrence of hindrance and to cope with it.

The display operation device may be mounted on an image processing apparatus transmitting image data through a communication device. The first UI component display device is a device for displaying an image transmission start button for activating a process for transmitting an image to a designated destination. The disabling device includes a trouble detecting device for detecting failure of designating an appropriate destination when an image is to be transmitted by the image processing apparatus, and a destination input message display device, responsive to detection of a trouble by the trouble detecting device, for displaying a message asking input of an appropriate destination of the image, as the second UI component, superposed on the image transmission start key.

If an appropriate destination is not input as the transmission destination, a message asking input of the destination is displayed as the second UI component, superposed on the image transmission start key. Before transmitting the image, the destination can be input without fail and, therefore, failure of image transmission can reliably be prevented.

More preferably, the second UI component is displayed in a transparent manner to allow recognition of a key displayed on a lower layer of the second UI component.

The first UI component displayed on the lower layer can be seen through the second UI component. The user can easily understand what type of problem occurred in connection with what type of process and, therefore, he/she can appropriately cope with the problem.

The display operation device may further include a disabling device, detecting occurrence of an event hindering the process to be activated by the process activating device, for displaying a third UI component at the same position as the first UI component, to be superposed on the first UI component, and thereby for disabling user operation of the first UI component. Here, the second UI component is displayed in a first color, and the third UI component is displayed in a second color different from the first color.

The second UI component is displayed in the first display color, and the third UI component is displayed in the second display color. Therefore, the user can easily understand whether the UI component displayed on the first UI component is the second or third UI component and, hence, he/she can follow an appropriate process.

According to a second aspect, the present invention provides an image processing apparatus, including: any of the above-described display operation device; an image forming device forming image data; and an image processing unit, connected to the display operation device and the image forming device, for processing the image data formed by the image forming device, based on an output instruction from the display operation device.

As described above, according to the present invention, when execution of a process starts in response to an operation of the first UI component and a condition related to the process occurs, the second UI component is displayed. The second UI component is displayed at the display position of the first UI component, to be superposed on the first UI component. The second UI component is easily viewable to the user, even if the user does not change his/her point of view. Therefore, the user can immediately execute a process to cope with the condition that has occurred or recognize the condition. For the user, it becomes easier to grasp the situation of the process related to the first UI component, and operability is also improved.

According to a third aspect, the present invention provides a method of receiving a user operation using a display-integrated operation panel having a display screen. The method includes the steps of displaying an image of a first UI component on the display screen; activating, in response to a user operation of the first UI component displayed on the display screen at the step of displaying the image of the first UI component, a process associated with the first UI component; and displaying, in response to occurrence of a predetermined condition related to the process activated at the step of activating a process, a second UI component on the display screen. The second UI component is displayed at a display position of the first UI component to cover the first UI component.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a flowchart of a program for the facsimile transmission process, realizing the display transition of the task trigger area shown in FIG. 15, in the image forming apparatus shown in FIG. 1.

DESCRIPTION OF THE PREFERRED EMBODIMENTS

Figure 1:
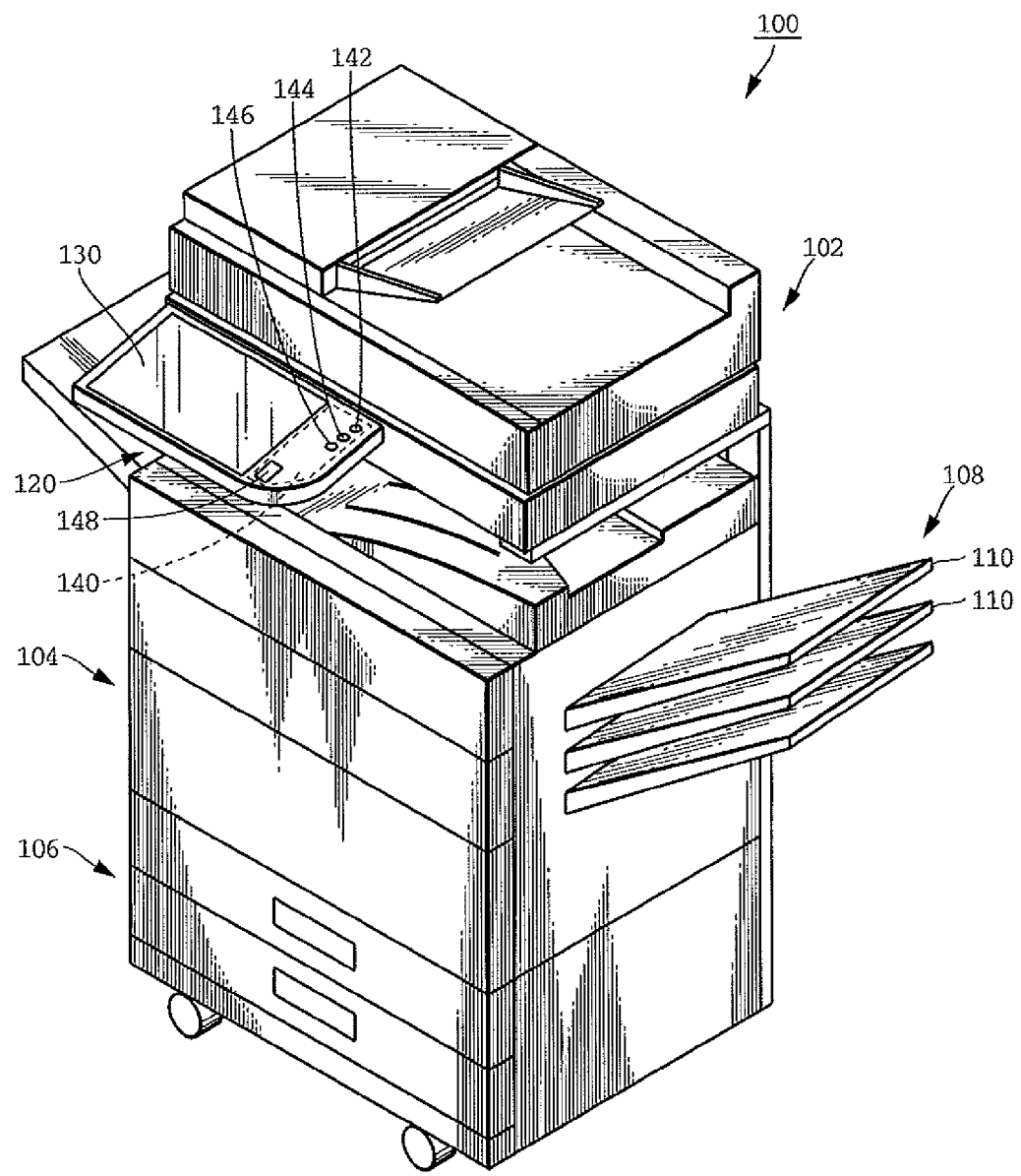
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

In the embodiment of the present invention, the display operation device is used in combination with an image forming apparatus as one type of image processing apparatuses. It is noted, however, that application of the display operation device in accordance with the present invention is not limited to the image forming apparatus. The present invention is applicable to other apparatuses, such as an image processing apparatus, or to any electronic device that gives instructions of operation using a screen image.

In the following description, a software key is described as an example of the UI component. The present invention, however, is not limited to such an embodiment. The present invention is applicable to any UI component that can function as a trigger for activating or stopping any process in response to an operation.

An image forming apparatus 100 (see FIG. 1) described in the following has a touch-panel (hereinafter simply referred to as a "touch-panel") as the display operation device.

The image forming apparatus forms an image on a sheet of recording paper by electro-photography. The image forming apparatus includes, as operational modes, copy mode, FAX mode, document filing mode (a mode in which a read image is stored in a storage device in the image forming apparatus) and mail mode (a mode in which a read image is transmitted attached to an electronic mail). The image forming apparatus 100 may further include network printer mode. The present invention is not limited to the above, and it may be any image forming apparatus including at least one of the four operational modes, that is, copy mode, FAX mode, document filing mode and mail mode, which requires, in at least one of the operational modes, an operation of pressing a key displayed on the touch-panel as a trigger of a task. The printing method is not limited to electro-photography.

[Configuration]

Figure 2:
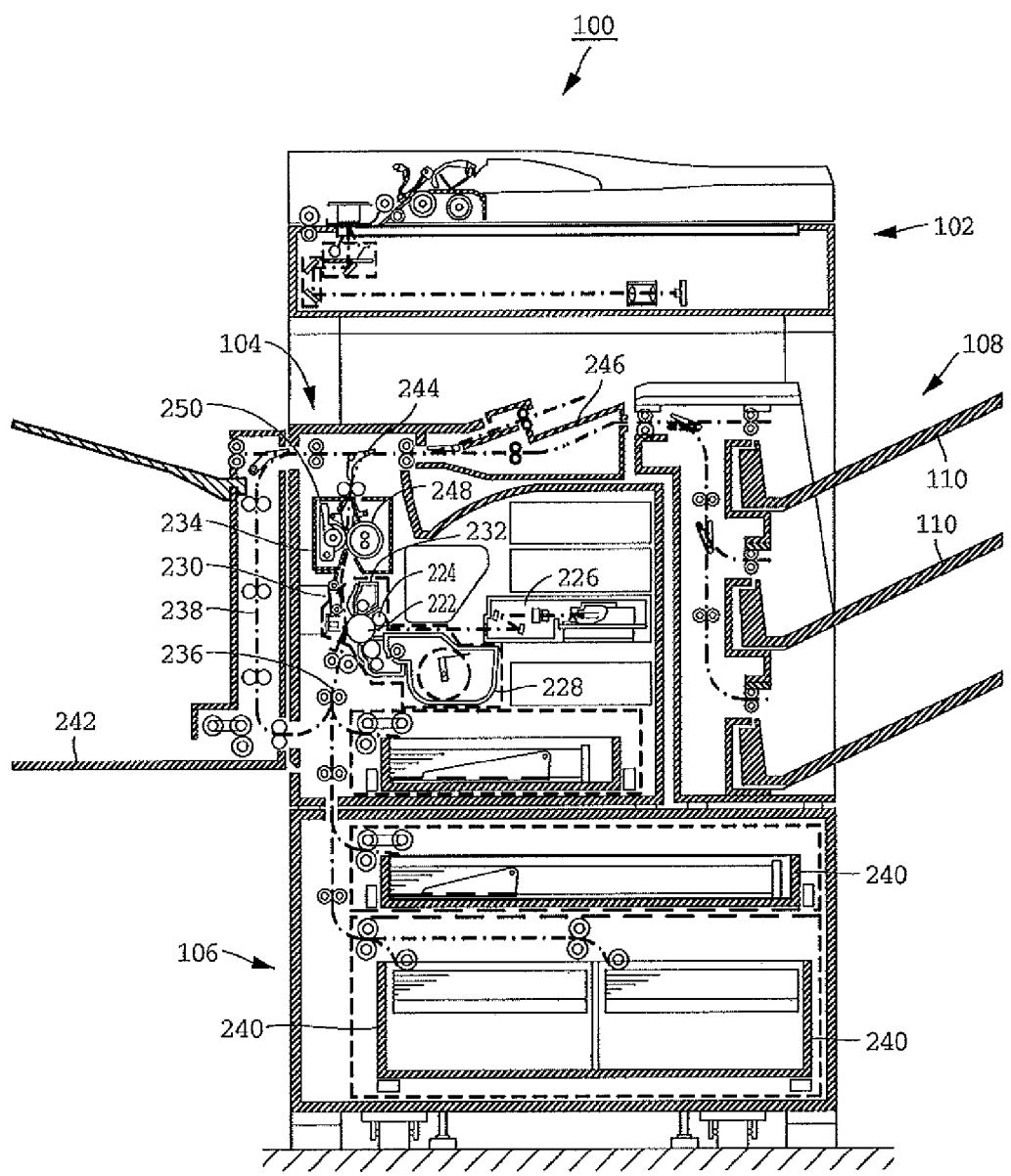
FIG. 2 schematically shows an internal configuration of the image forming apparatus shown in FIG. 1.
Figure 3:
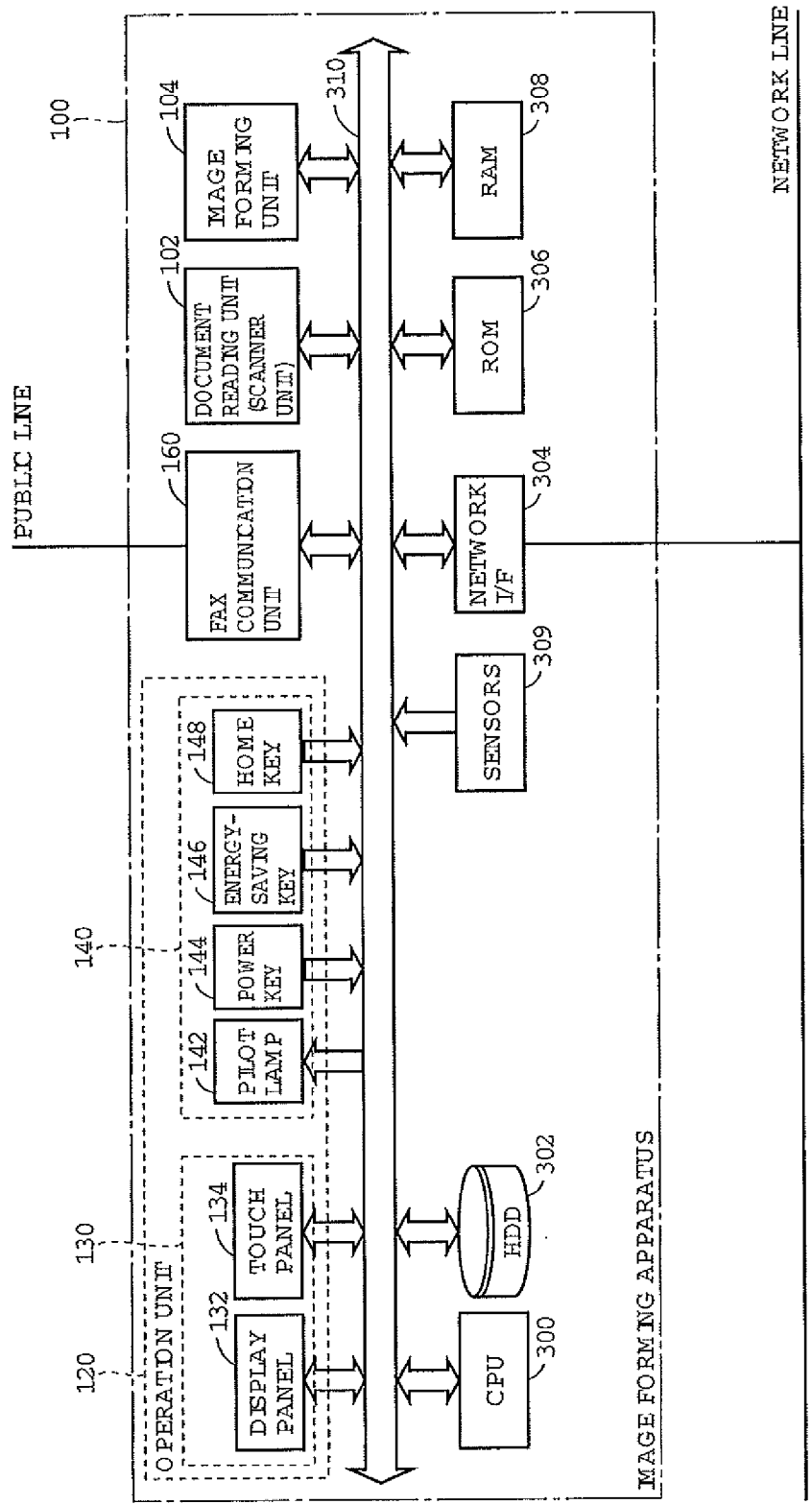
FIG. 3 is a block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 (hereinafter simply referred to as "display 130") and a display operation unit 140. Display 130 includes a display panel 132 formed of a liquid crystal panel or the like, and a touch-panel 134 arranged on display panel 132. Touch-panel 134 detects that a user's finger is touching its surface and also detects the touched position. Display operation unit 140 includes a pilot lamp 142, a power key 144, an energy-saving key 146, and a home key 148 for returning the display screen image on display 130 to a home screen image. The home screen image is a screen image allowing the user to select various operational modes.

Figure 4:
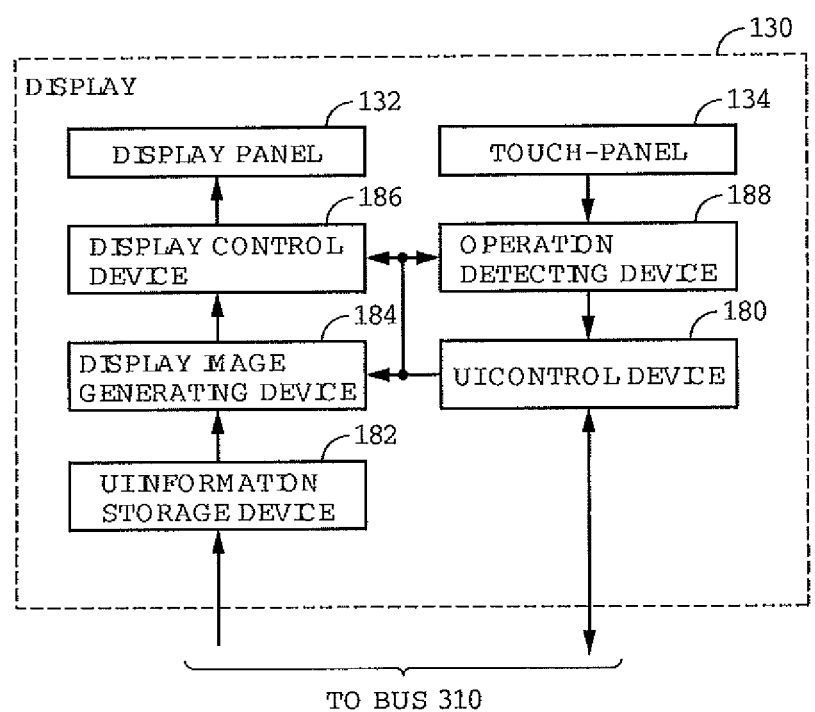
FIG. 4 is a block diagram of a display of the image forming apparatus shown in FIGS. 1.

Referring to FIG. 4, in addition to display panel 132 and touch-panel 134, display 130 more specifically includes: a UI control device 180, implemented by an embedded computer, connected to a bus 310 and executing a prescribed display control program to realize display transitions of various keys as will be described later; a UI information storage device 182, connected to UI control device 180 and bus 310, for storing information related to various objects necessary for screen image display; and a display image generating device 184 connected to UI control device 180 and UI information storage device 182 for generating display images of various objects on the screen image to be displayed on display panel 132. Display 130 further includes: a display control device 186 connected to UI control device 180, display panel 132 and display image generating device 184 for controlling display panel 132 such that the display image generated by display image generating device 184 is displayed; and an operation detecting device 188 connected to touch-panel 134 and UI control device 180, for detecting the user touching touch-panel 134, outputting coordinates of the touched position and applying the output to UI control device 180. Based on the position coordinate information and the information related to the displayed image, UI control device 180 detects which key is operated by the user and what trajectory is drawn by the user's finger, and by interpreting these pieces of information, outputs the result to a CPU 300 in image forming apparatus 100 through bus 310.

Image forming apparatus 100 in accordance with the present embodiment is provided with display 130 as a main operation device, and, in addition, with display operation unit 140 including hardware keys and a pilot lamp. The keys (power key 144, energy-saving key 146 and home key 148) of display operation unit 140 are hardware keys, different from the software keys realized by display 130.

The present embodiment is characterized in that after an operation is instructed by a key displayed at the time of executing a task such as document reading, facsimile transmission of the document and copying, a key is displayed at the same position and in substantially the same manner of display (color, shape, configuration (mark or the like), design etc.) for giving an instruction (interruption, termination, continuation or the like) related to the process of which operation has been instructed. Here, whether or not the colors are similar may be determined in the following manner. By way of example, if a distance between vectors representing colors represented in RGB components (given as vectors of three components) is within 5% from the maximum distance between the vectors, the colors may be determined as analogous colors.

Such a process is executed in any of the copy mode, mail mode, FAX mode and the document filing mode.

In the following, first, the configuration of image forming apparatus 100 will be briefly described mainly with reference to the copy mode. Thereafter, the display transition at the time of document reading, in the facsimile mode and the copy mode will be described.

In the copy mode, mainly document reading unit 102 and image forming unit 104 operate.

In image forming apparatus 100, a document placed on a platen is read by document reading unit 102 as image data. The image data is subjected to various image processing operations, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

For each of the black toner and the color toner, a sensor for detecting toner-out is provided. Further, a paper sensor detecting absence of any paper on paper cassette 240, and various sensors necessary for detecting occurrence of a paper jam on the paper feed path are provided on main feeding path 236 and reverse feeding path 238.

Referring to Fig, 3, image forming apparatus 100 further includes: operation unit 120 allowing setting of functions related to the copy mode, facsimile mode, document filing mode and mail mode; ROM (Read Only Memory) 306 for storing programs and the like; a hard disk drive (hereinafter denoted as HDD) 302 as a non-volatile storage area capable of storing programs and data even when power is cut off and an RAM (Random Access Memory) 308 providing a storage area when a program is executed.

Image forming apparatus 100 further includes a bus 310 connected to document reading unit 102, image forming unit 104, FAX communication unit 160, operation unit 120, ROM 306, HDD 302, and RAM 308, and CPU (Central Processing Unit) 300 connected to bus 310, realizing general functions as the image forming apparatus.

HDD 302 stores files of image data of documents read by image forming apparatus 100, folder by folder, together with date and time of saving and name of the user who saved.

ROM 306 stores programs and data necessary for controlling operations of image forming apparatus 100. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160. To network interface 304, a network line is connected. To the network line, a computer or the like using image forming apparatus 100 as a network-supported printer may be connected, or a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, display 130 and display operation unit 140 forming operation unit 120, ROM 306, HDD 302 and RAM 308 by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, display 130 is provided on the left side area, and display operation unit 140 (pilot lamp 142 and power key 144, energy-saving key 146 and home key 148 as hardware keys) is provided on the right side area. Display 130 and display operation unit 140 form operation unit 120 as one integrated body as a whole.

As described above, display 130 is formed of display panel 132 and touch-panel 134 arranged on display panel 132. On display panel 132 of display 130, a home screen image allowing selection of an operational mode of image forming apparatus 100, current state of image forming apparatus 100, status of destination designation, and status of job processing are displayed. On a display area of display panel 132, selection keys as software keys are displayed, When a portion where the selection key is displayed is pressed by a finger, touch-panel 134 detects the pressed position and outputs information indicating the position. By comparing the display position of the selection key and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, and pilot lamp 142 is turned and kept on. If a predetermined time passes without any user operation, or if the user presses energy-saving key 146, image forming apparatus 100 makes a transition from the normal mode to the energy saving mode, and pilot lamp 142 flickers. Further, if the user presses energy-saving key 146 in the energy saving mode, the image forming apparatus 100 makes a transition from the energy saving mode to the normal mode. Home key 148 is a hardware key for returning the display of display 130 to the initial state (home screen image).

Image forming apparatus 100 in accordance with the present embodiment includes the four operational modes (copy mode, facsimile mode, document filing mode and mail mode) as described above. On display 130, software keys for setting functions in respective operational modes are displayed, and keys for setting a destination or a preview as an expected image, for example, are displayed as needed.

On memo display area 354, a piece of maintenance information or the like to be notified to every user of image forming apparatus 100 is displayed.

[Layout of Copy Basic Screen Image]

Figure 5:
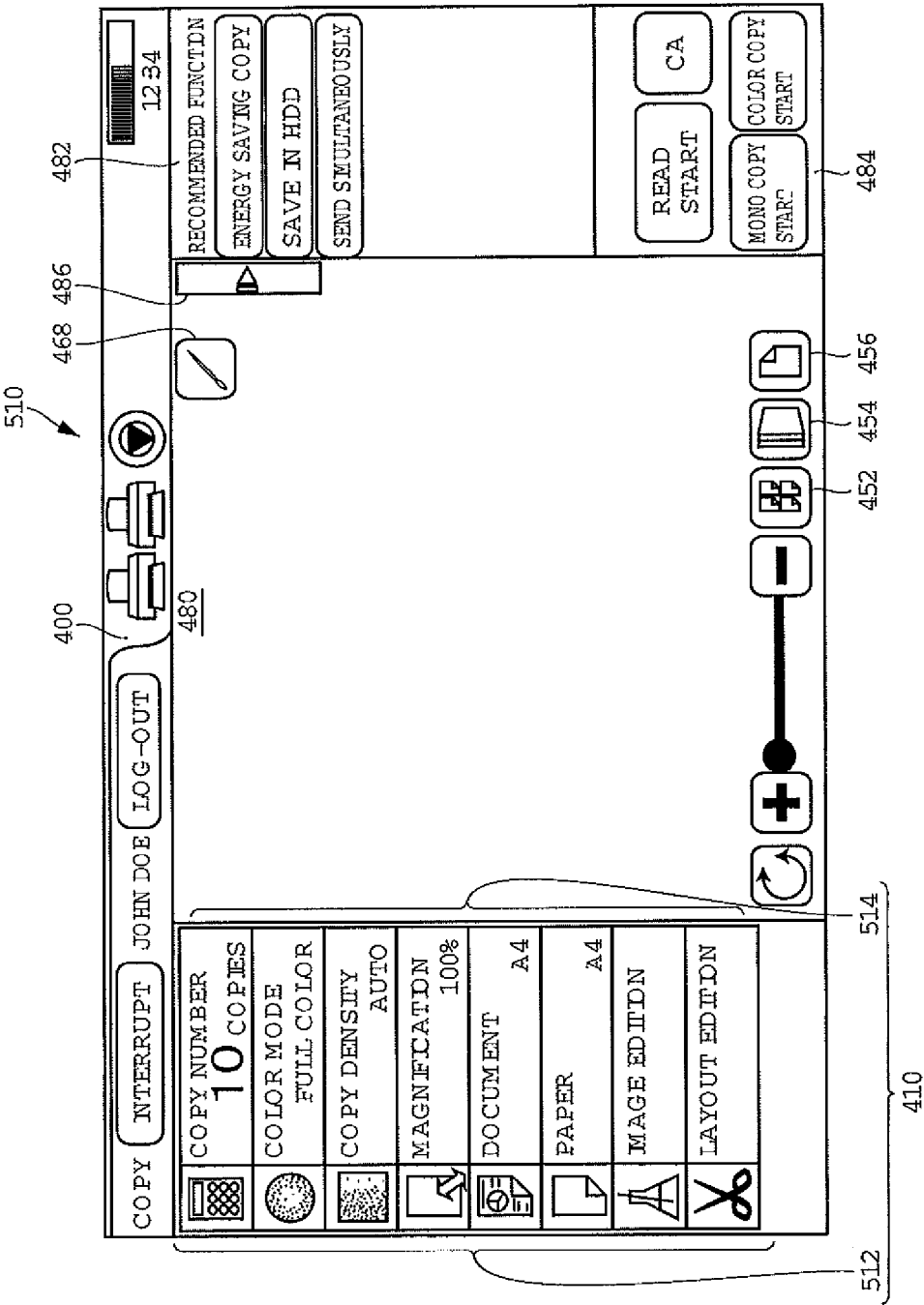
FIG. 5 shows an initial screen image in the copy mode, of a preview display of the image forming apparatus.

FIG. 5 shows a basic layout in the copy mode operation (referred to as a "copy basic screen image") 510 on display 130. The copy basic screen image 510 is first displayed when the copy mode is selected. One characteristic of the present embodiment is that, basically, preview is possible in all screen images including the copy basic screen image. Similar image preview can be selected at the time of facsimile transmission, image transmission by mail or image filing. In any of these operational modes, basic screen image configuration related to preview display is the same. Therefore, in the following, only the copy basic screen image will be described.

Referring to FIG. 5, let us consider display 130 of landscape layout (for example, width of 1024 pixels×length of 600 pixels). System area 400 is arranged at the uppermost portion, and preview area 480 is arranged at the center, of the screen image. On the left side of preview area 480, function selecting area 410 for setting a function and confirming the contents of function is arranged. On the upper right side of preview area 480, an area referred to as an action panel area (herein after referred to as "action panel area 482") is arranged. On a lower right side of preview area 480, task trigger area 484 is arranged. These areas have their sizes changed in accordance with the preview display modes, as will be described later.

On system area 400, the current state of image forming apparatus 100 is displayed and, in addition, the title of operational mode that is being operated and status/state of image forming apparatus 100 are displayed. By way of example, on system area 400, an operational mode name, an interruption key, a log-in user name, status of a currently processed job, state of use of an internal memory, time and the like are displayed.

On function selecting area 410, a function selection menu (icons, keys, setting items screen image, and a function list screen image) to be operated by the user for setting each function, switching display and confirming setting, is displayed. These are for setting conditions of data conversion and conditions at the time of executing a task, on the image data of the document. On function selecting area 410, a group of functional icons 512 and a group of texts 514 describing the function of each functional icon are displayed.

In preview area 480, an image of expected document output (finished form) is displayed. Every time the user designates the manner of finish, the image displayed on preview area 480 changes. At the time of reading, the read document image is displayed.

Preview area 480 includes a group of preview change keys at a lower portion, for changing display style of preview area 480. The group of preview change keys includes: a rotation key for rotating the preview by a desired angle; a zoom bar for enlarging/reducing the preview image; a document display mode key 452 instructing change to a document display mode, as will be described later; a finish preview key 454 instructing a change to a finish preview screen image; and a fit-to-screen key 456 instructing a change to the fit-to-screen mode. At an upper right portion of preview area 480, an image edition key 468 is arranged, for instructing a change to an image edition mode allowing edition of documents.

If the number of pages of document images to be displayed on preview area 480 is large, a page selection key (page number input key, page feed key, page return key, single page display key, plural page display key and the like), not shown, is displayed. When the document image displayed on preview area 480 is flicked, the document page can be fed forward or backward. If the document image displayed on preview area 480 is large, a scroll bar that can be touch-operated or gesture-operated is displayed.

On action panel area 482, pieces of information related to assistance, guidance and suggestion related to the operation are displayed. If, for instance, a user selects a specific function, on action panel area 482, functions related to the selected function may be displayed. Other functions related to the same object of the selected function may be displayed. Further, functions selected in the past by the user or a user of a group to which the user belongs in relation to the selected function may be displayed as "recommended functions."

On the left side of action panel area 482, an action panel reducing key 486 is displayed, which is operated by the user when action panel area 482 is to be displayed in reduced size. When action panel reducing key 486 is pressed, action panel area 482 is reduced in size and displayed in the form of keys on the right side of the screen image. When the key is pressed, action panel area 482 is again displayed in the enlarged size. Specifically, the user can reduce or enlarge the action panel area 482 by pressing the key. Accordingly, the preview area 480 is enlarged or reduced. Confirmation of preview image and confirmation of operation hints can be done easily in accordance with the user's intention.

In task trigger area 484, items (software keys as one type of UI components) as triggers for starting certain processes of image forming apparatus 100 are displayed. These items are displayed when all settings are completed in a certain operational mode and image forming apparatus 100 is ready to operate actually. By way of example, on task trigger area 484, a read start key, a monochrome copy start key, a color copy start key and a clear-all key (CA) are displayed. The read start key is a key for starting a process for once reading a document and providing a preview in copying or FAX transmission. The monochrome copy start key is a key for starting a process for reading a document and immediately forming a monochrome image thereof on a sheet of recording paper, or for starting the process of forming a monochrome image on a sheet of recording paper based on once read image. The color copy start key is similarly a key for starting the process of immediately forming a color image of the document, or for starting the process of forming a color image on a sheet of recording paper based on once read image. The clear-all key is a key for clearing all pieces of input information. When the clear-all key is pressed at the time of document reading, all documents that have been read are cleared, and the screen image returns to the copy initial screen image.

In the present embodiment, when any of the keys for starting various types of processes (UI components as various keys on task trigger area 484) is pressed, a key, such as a cancel key or a stop key (another UI component) instructing a different process related to the process is displayed superposed on the pressed key. Here, the manner of display of the keys displayed at the same position (color, shape, configuration (mark or the like), design etc.) is set to be substantially the same.

The key display in accordance with the present embodiment is realized on various aspects. In the following, the manner of display of the task trigger area 484 at the time of paper-out, toner-out, document reading and facsimile transmission, as well as the control structures of the programs realizing such displays will be described.

<<Paper-Out>>

Figure 6:
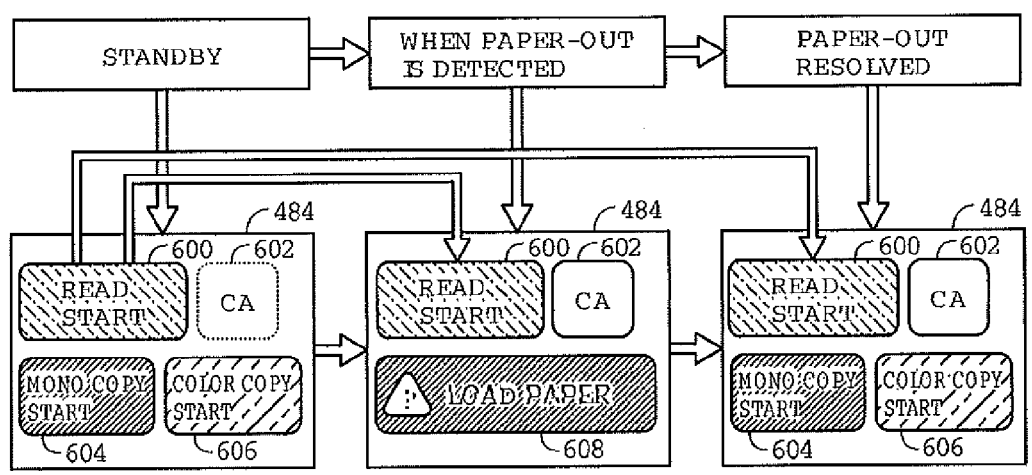
FIG. 6 shows display transitions of a task trigger area, when paper-out is detected in the image forming apparatus shown in FIG. 1.

Referring to FIG. 6, when paper-out occurs, the display of task trigger area 484 changes in the following manner. Referring to the left side of FIG. 6, generally, on task trigger area 484, a read start key 600, a clear-all key 602, a monochrome copy start key 604 for activating a process for forming an image using black toner, and a color copy start key 606 for activating a process for forming an image using color toner are displayed. These are displayed at positions different from each other and not overlapping with each other. It is noted that before the start of reading, clear-all key 602 is not usable and, therefore, it is grayed out.

If the user wants to make some output on a sheet of paper (typically, if the user is to execute a copy process) and necessary paper is not detected on paper cassette 240, a paper-out key 608, which represents a message asking loading of paper, is displayed at such a position and in such a shape that cover monochrome copy start key 604 and color copy start key 606, as shown at the center of Fig, 6. While paper-out key 608 is displayed, the user cannot operate monochrome copy start key 604 and color copy start key 606. When the user loads the paper, paper-out key 608 disappears as shown on the right side of FIG. 6, and monochrome copy start key 604 and color copy start key 606 are displayed. The user can start a copy process by operating these keys.

<<Program Structure Realizing Paper-Out Process>>

Figure 7:
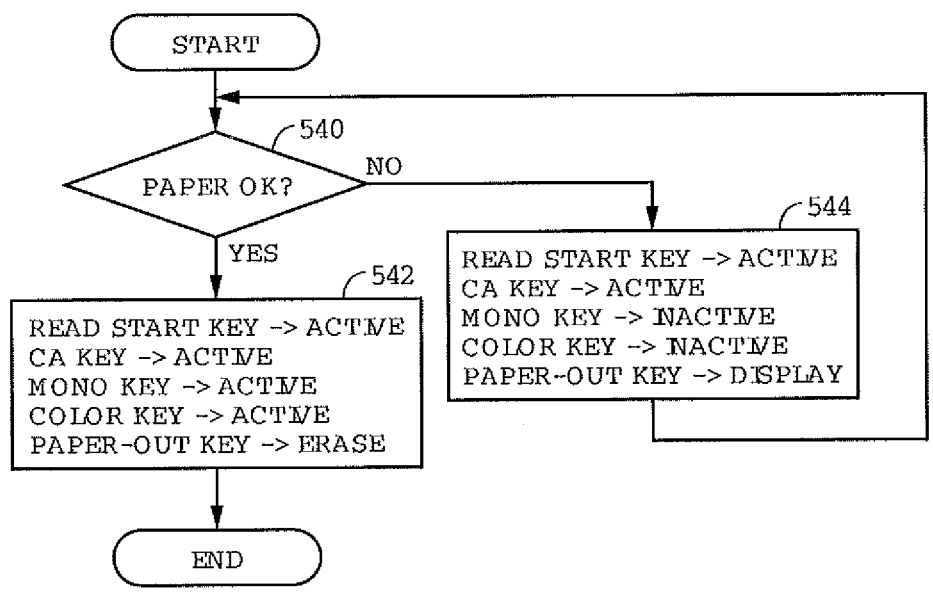
FIG. 7 is a flowchart representing a control structure of a program realizing the display of FIG. 6.

FIG. 7 shows, in the form of a flowchart, a control structure of the program for realizing the display shown in FIG. 6. Referring to FIG. 7, the program is periodically executed, and if the user operation represents a process requiring output to a sheet of paper, the result of the program is displayed. By way of example, on the basic screen image of copy process, the result of execution of the program is displayed, First, at step 540, whether or not paper cassette 240 contains paper necessary for the output is determined. If the determination is positive, the control proceeds to step 542, at which read start key 600 is activated, clear-all key 602 is inactivated, and monochrome copy start key 604 and color copy start key 606 are activated. If paper-out key 608 has been displayed, paper-out key 608 is erased. After step 542, execution of the program is terminated, and the control returns to a main routine. If the determination at step 540 is negative, the control proceeds to step 544. At step 544, read start key 600 and clear-all key 602 are activated, and monochrome copy start key 604 and color copy start key 606 are inactivated. Further, paper-out key 608 is displayed at the same position as, and being superposed on monochrome copy start key 604 and color copy start key 606, After step 544, execution of the program is terminated, and the control returns to the main routine.

Therefore, once paper-out key 608 is displayed, monochrome copy start key 604 and color copy start key 606 are not displayed and the copy process cannot be started, unless the paper is loaded to paper cassette 240 or the user changes setting.

<<Toner-Out>>

Figure 8:
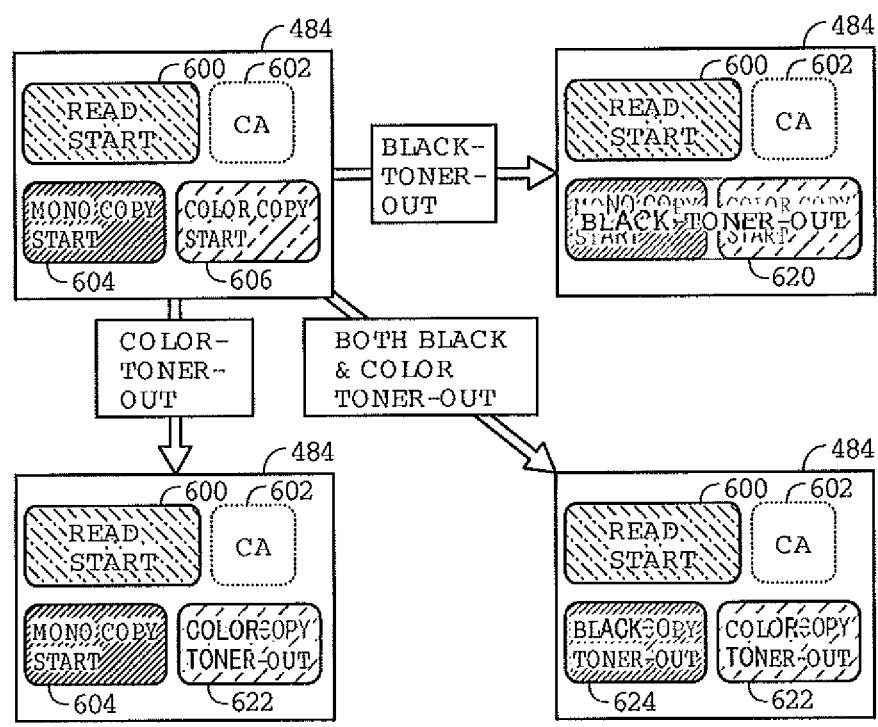
FIG. 8 shows display transitions of a task trigger area, when toner-out is detected in the image forming apparatus shown in FIG. 1.

In an image forming apparatus, if toner-out occurs, image formation on a sheet of recording paper becomes impossible. FIG. 8 shows the manner of display of task trigger area 484 when toner-out occurred.

The upper left portion of FIG. 8 shows a normal manner of display of task trigger area 484. Here, if black-toner-out is detected, the display changes to the one shown on the upper right side of FIG. 8. Referring to the upper right side of FIG. 8, here, a black-toner-out key 620 as a message asking replenishment of black toner, is displayed at the same position being superposed on monochrome copy start key 604 and color copy start key 606. In this example, black-toner-out key 620 is semi-transparent, so that monochrome copy start key 604 and color copy start key 606 can be seen through this key. As long as black-toner-out key 620 is displayed, neither monochrome copy start key 604 nor color copy start key 606 can be operated.

If color-toner-out is detected while task trigger area 484 is in the state shown on the upper left side of FIG. 8, the display changes to the state shown on the lower left side of FIG. 8. In this state, though the color toner is in short supply, black toner is sufficient. Namely, though color copy is impossible, monochrome copy can be taken. Therefore, a color-toner-out key 622 as a message asking replenishment of color toner is displayed at the same position and in the same size as color copy start key 606, The display of monochrome copy start key is kept unchanged. Since color-toner-out key 622 is semi-transparent, color copy start key 606 can be seen therebelow. However, color copy start key 606 cannot be operated. Though monochrome copy can be started by operating monochrome copy start key 604, color copy cannot be made unless the color toner is replenished.

If it is detected that both black toner and color toner are out, the display of task trigger area 484 changes to the state as shown on the lower right side of FIG. 8. Specifically, black-toner-out key 624 is displayed on monochrome copy start key 604, and color-toner-out key 622 is displayed on color copy start key 606. Neither of monochrome copy start key 604 and color copy start key 606 can be operated, and copying is impossible.

From any of the states shown on the upper right side, lower left side and lower right side of FIG. 8, the display of task trigger area 484 returns to the state shown on the upper left side of FIG. 8 if the toner is replenished.

Figure 9:
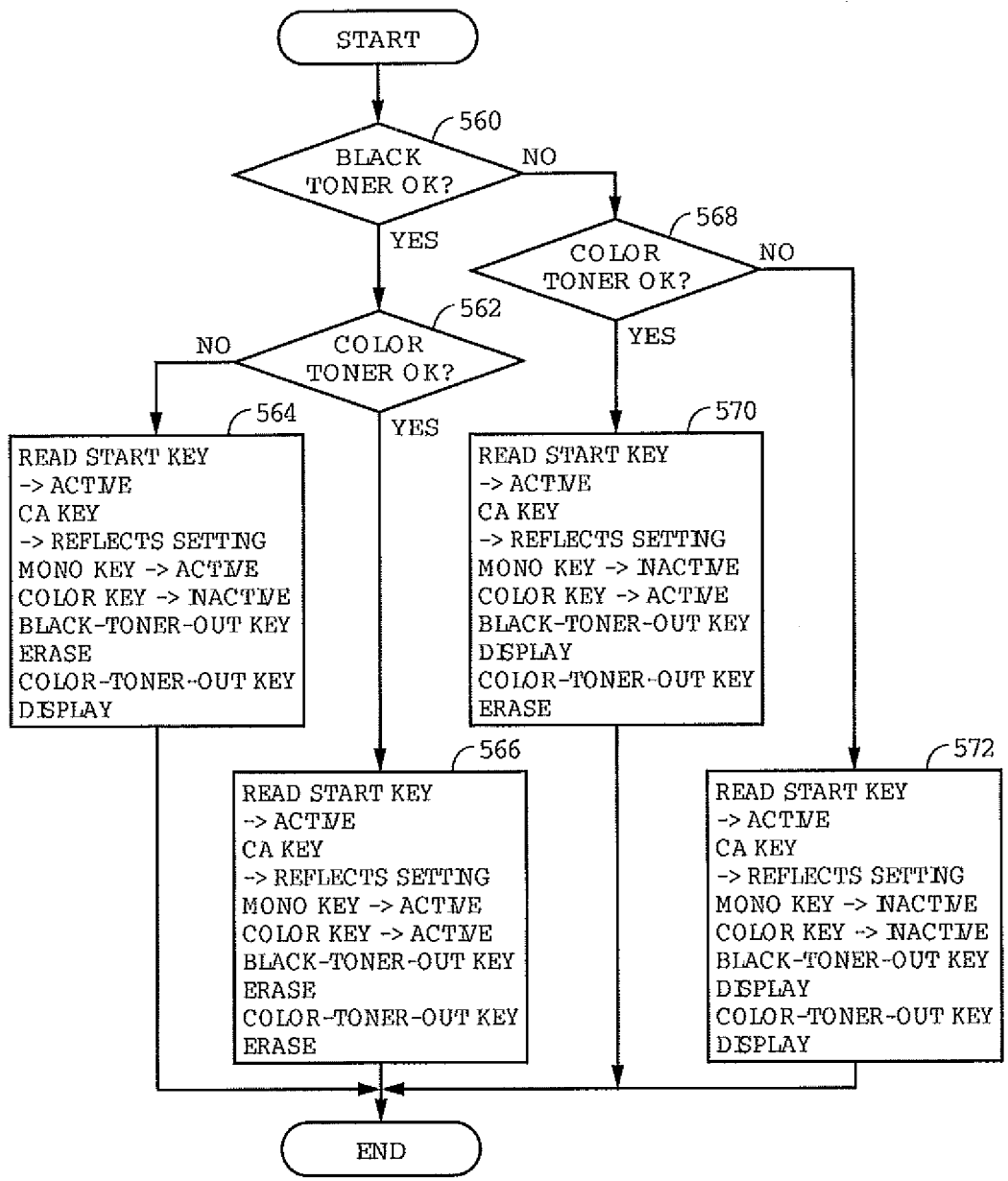
FIG. 9 is a flowchart representing a control structure of a program realizing the display of FIG. 8.

FIG. 9 is a flowchart of a program realizing the display of task trigger area 484 shown in FIG. 8. The program is periodically executed by a timer. By way of example, this program is executed at the interval of 1 sec. The result is reflected on task trigger area 484 on, for example, the basic screen image of a process (copy process) that uses the toner.

The program starts at step 560. At step 560, whether or not the black toner is sufficient is determined. If the determination is positive, the control proceeds to step 562, and if it is negative, the control proceeds to step 568.

At step 562, whether or not the color toner is sufficient is determined. If the determination is positive, the control proceeds to step 566, and if it is negative, the control proceeds to step 564.

At step 566, read start key 600 is activated. Clear-all key 602 is displayed in accordance with the situation at that time. Specifically, if any setting has been made, clear-all key 602 is activated, and if no setting has been made, clear-all key 602 is inactivated. Both monochrome copy start key 604 and color copy start key 606 are activated. Black-toner-out key 624, color-toner-out key 626 and black-toner-out key 620 are all erased. As a result, the display shown on the upper left side of FIG. 8 is realized. After step 566, execution of the program ends, and the control returns to the main routine.

On the other hand, at step 564, read start key 600 is activated. Clear-all key 602 is activated or inactivated in accordance with the situation. Monochrome copy start key 604 is activated. Color copy start key 606 is inactivated. Black-toner-out key 624 and black-toner-out key 620 are erased, and color-toner-out key 622 is displayed. As a result, the display shown on the lower left side of FIG. 8 is realized. After step 564, execution of the program ends, and the control returns to the main routine.

If the determination at step 560 is negative, at step 568, whether or not the color toner is sufficient is determined. If the determination is positive, the control proceeds to step 570, and if it is negative, the control proceeds to step 572.

At step 570, read start key 600 is activated, and clear-all key 602 is activated or inactivated in accordance with the situation. Monochrome copy start key 604 and color copy start key 606 are both inactivated. Black-toner-out key 620 is displayed. Black-toner-out key 624 and color-toner-out key 622 are erased. As a result, the display shown on the upper right side of FIG. 8 is realized. After step 570, execution of the program ends, and the control returns to the main program.

If the determination at step 568 is negative, at step 572, read start key 600 is activated, and clear-all key 602 is activated or inactivated depending on presence/absence of any setting. Monochrome copy start key 604 and color copy start key 606 are both inactivated, and black-toner-out key 624 and color-toner-out key 622 are both displayed. As a result, the display of task trigger area 484 becomes as shown on the lower right side of FIG. 8. After step 572, execution of the program ends, and the control returns to the main routine.

<<Document Reading Process>>

Figure 10:
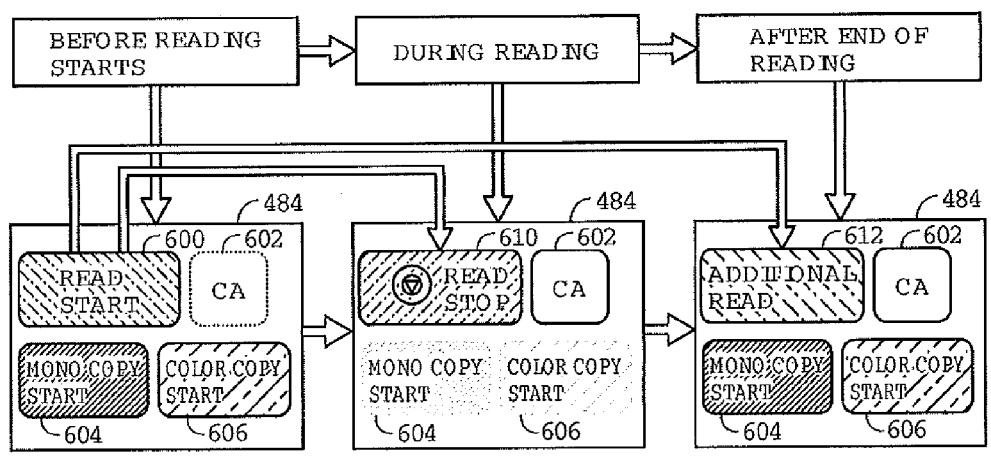
FIG. 10 shows display transitions of a task trigger area, when a document reading process is executed in the image forming apparatus shown in FIG. 1.

Referring to FIG. 10, at the time of document reading, the display of task trigger area 484 changes in the following manner. Referring to the left side of FIG. 10, on task trigger area 484, read start key 600, clear-all key 602, monochrome copy start key 604 and color copy start key 606 are displayed as described above.

Assume, for example, that the user pressed read start key 600 for reading a document. During reading, task trigger area 484 changes to the state shown at the center of FIG. 10. Specifically, a read stop key 610 is displayed being superposed on read start key 600. Read stop key 610 and read start key 600 are displayed at the same position in the same size and same shape. The function of read stop key is to stop the reading process started by the operation of read start key 600. Read stop key 610 is displayed at the same position and in the same display manner as read start key 600. Specifically, read stop key 610 is displayed over read start key 600. In other words, read start key 600 is displayed on a lower layer of read stop key 610. The same applies to other keys. Any key is disabled, that is, made inoperable, if another key is displayed on its upper layer.

Further, when the reading ends, in place of read stop key 610, an additional read key 612 is displayed at the same position and in the same size as read stop key 610, as shown on the right side of FIG. 10. The function of additional read key 612 is to read a document image in addition to the document read immediately before, and to save the images as continuous document images. This function may be regarded as a function of resuming the process of which execution is started by pressing read start key 600, once the process is completed. These functions are similar to each other. Therefore, additional read key 612 is displayed at the same position as read start key 600.

<<Program Structure Realizing Document Reading Process>>

The display transition of task trigger area 484 described above is realized by a program executed by a CPU, not shown, in UI control device 180 of display 130 shown in FIG. 4. In the following, a control structure of a program for document reading will be described as an example of such a program, with reference to FIG. 11. The program represents the display transition such as shown in FIG. 10. The program starts when the user operates read start key 600 in task trigger area 484 (see FIG. 10). Before this operation, the display of task trigger area 484 is as shown on the left side of FIG. 10.

Figure 11:
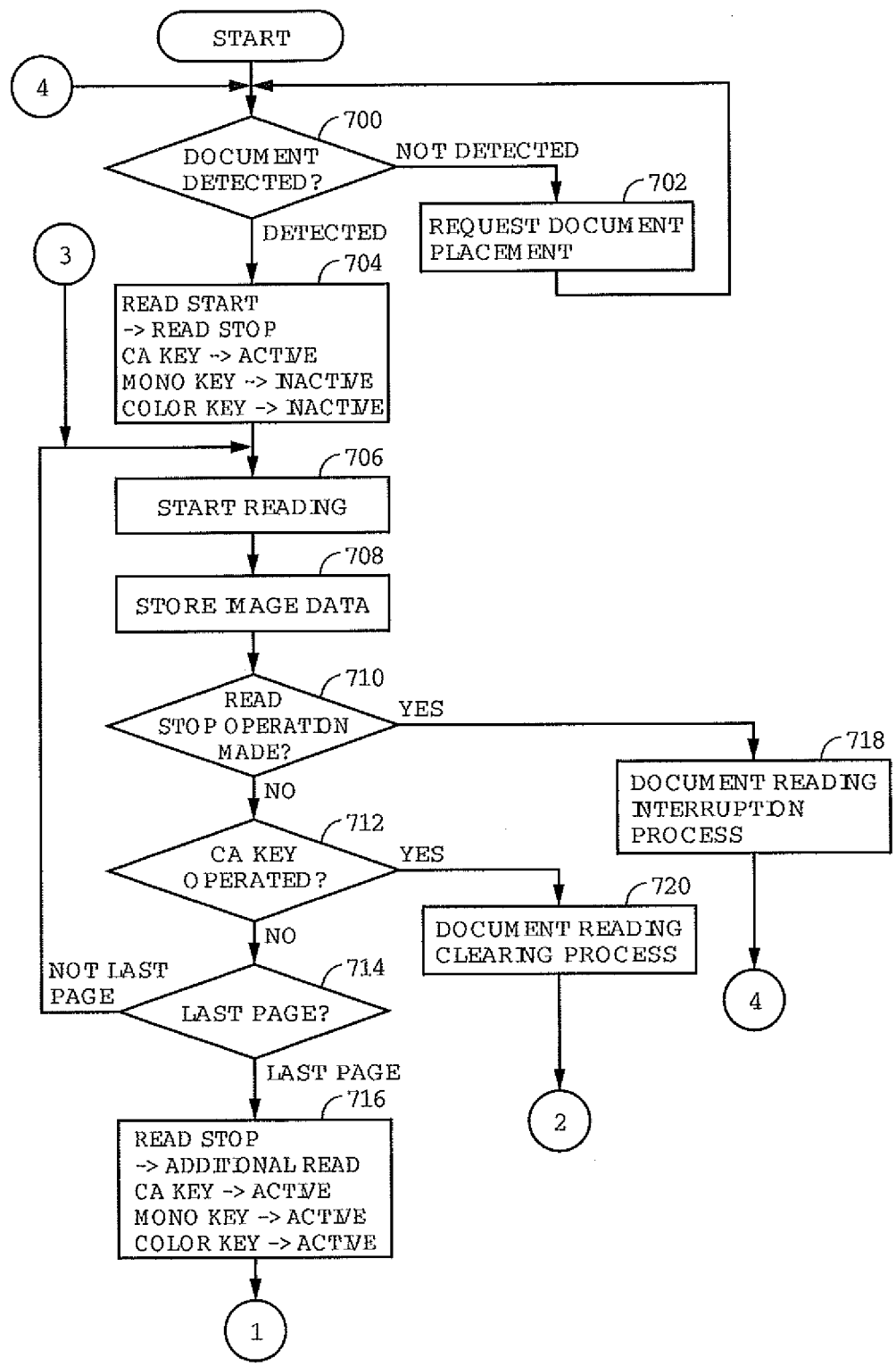
FIGS. 11 and 12 show a flowchart representing a program realizing the display transition of the task trigger area shown in FIG. 10, in the image forming apparatus shown in FIG. 1.

Referring to FIG. 11, the program includes step 700 of detecting a document in a tray of a document reading device, and a step 702 executed if the detection of any document failed, of requesting the user to place a document on the tray and to return the control to step 700.

If any document is detected at step 700, the control proceeds to step 704. At step 704, read stop key 610 is displayed in place of read start key 600, as shown at the center of FIG. 10. Read stop key 610 is displayed at the same position, in the same shape and in the same size as read start key 600. Further, at step 704, the display of clear-all key 602 is changed from grayed-out state to the normal display, indicating that clear-all key is active. Monochrome copy start key 604 and color copy start key 606 are displayed as in the inactive state.

Thereafter, at step 706, reading of one page of the document is executed. At this time, UI control device 180 sends a signal indicating that reading of document has been instructed, to CPU 300. In response to the signal, CPU 300 operates document reading unit 102, to start reading of the document. At step 708, the read image is stored in HDD 302 shown in FIG. 3.

Thereafter, whether or not an operation to stop reading has been made is determined at step 710. Specifically, whether read stop key 610 shown at the center of FIG. 10 has been pressed or not is determined. If the determination is positive, the control proceeds to step 718. At step 718, a document reading interruption process takes place, and the control returns to step 700. The document reading interruption process is a process to have the overall condition of image forming apparatus 100 returned to the state immediately before the instruction of document reading (or additional reading of document) was made the last time.

If the determination at step 710 is negative, the control proceeds to step 712. At step 712, whether or not clear-all key 602 has been operated is determined, If the determination is positive, the control proceeds to step 720. At step 720, a document reading clearing process is executed. The document reading clearing process refers to a process in which not only the read document data but also settings are all cleared. Thereafter, the control returns to step 700.

If the determination at step 712 is negative, the control proceeds to step 714, At step 714, whether or not the read page is the last page is determined. If the determination at step 714 is negative, the control returns to step 706. If the determination at step 714 is positive, the control proceeds to step 716.

At step 716, the display transition from the center to the right side of FIG. 10 takes place. In place of read stop key 610, additional read key 612 is displayed at the same position, in the same size and in the same manner of display. Clear-all key 602, monochrome copy start key 604 and color copy start key 606 are all active. Thereafter, the control proceeds to step 722 shown in FIG. 14.

At step 722, whether or not color copy start key 606 has been operated is determined. If the determination is positive, the control proceeds to step 724. If the determination is negative, the control proceeds to step 730.

At step 724, additional read key 612 becomes inactive, and grayed-out, Clear-all key 602 remains active. In place of monochrome copy start key 604 and color copy start key 606, the copy stop key is displayed to be superposed on these keys (not shown in FIG. 10). Thereafter, at step 726, the process of outputting the document read by that time in color is executed, Finally, the process of returning the display of task trigger area 484 to the left side of FIG. 10 is executed at step 728, and the process ends, Specifically, at step 728, read start key 600 is activated, clear-all key 602 is inactivated, both monochrome copy start key 604 and color copy start key 606 are activated, and the copy stop key is erased.

On the other hand, if the determination at step 722 is negative, at step 730, whether or not monochrome copy start key 604 has been operated is determined. If the determination is positive, the control proceeds to step 732. If the determination is negative, the control proceeds to step 736.

At step 732, as at step 724, additional read key 612 is inactivated, clear-all key 602 is activated, and in place of monochrome copy start key 604 and color copy start key 606, the copy stop key is displayed. Thereafter, at step 734, the process of outputting document images that have been read and stored by that time in black and white is executed. Thereafter, the control proceeds to step 728 described above.

If the determination at step 730 is negative, at step 736, whether or not additional read key 612 has been operated is determined. If the determination is positive, the control proceeds to step 738. If the determination is negative, the control proceeds to step 740.

At step 738, the read stop key is displayed at the same position as additional read key 612. Clear-all key 602 is activated. Monochrome copy start key 604 and color copy start key 606 are both activated. Thereafter, the control proceeds to step 706 of FIG. 1.

If the determination at step 736 is negative, whether or not clear-all key 602 has been operated is determined at step 740. If the determination is positive, the control proceeds to step 742. If the determination is negative, the control returns to step 722.

At step 742, all document image data read by that time are cleared, and the control proceeds to step 728.

<<Copy Process>>

Figure 13:
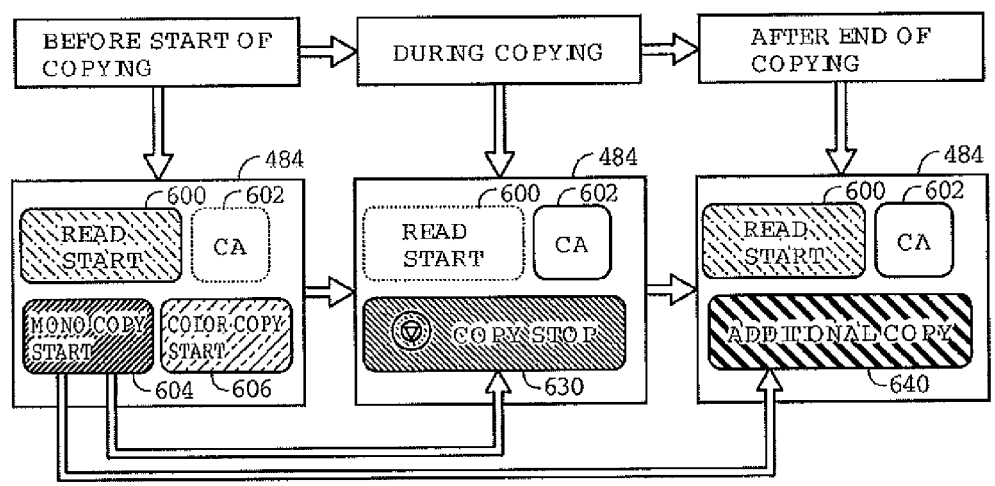
FIG. 13 shows display transitions of a task trigger area, when a copy process is executed in the image forming apparatus shown in FIG. 1.

The display transition of task trigger area 484 at the time of copy process is as follows. Referring to FIG. 13, at the start of copying, on task trigger area 484, read start key 600, clear-all key 602, monochrome copy start key 604 and color copy start key 606 are displayed. Here, if the user operates monochrome copy start key 604, in place of monochrome copy start key 604 and color copy start key 606 (being superposed on these keys), copy stop key 630 is displayed. When the copying is complete, in place of additional monochrome copy start key 632 and additional color copy start key 634 shown in FIG. 13, an additional copy key 640 is displayed at the same position and in the same shape as copy stop key 630. Here, if additional copy key 640 is pressed, additional copying is executed in the same copy mode as the copy mode of the initially pressed key (monochrome copy start key 604 or color copy start key 606).

<<Program Structure Realizing Copy Process>>

The control structure of a program for copying a document without storing the read document such as shown in FIG. 13 will be described with reference to FIG. 14. Initially, task trigger area 484 is in such a state as shown on the left side of FIGS. 13.

Figure 14:
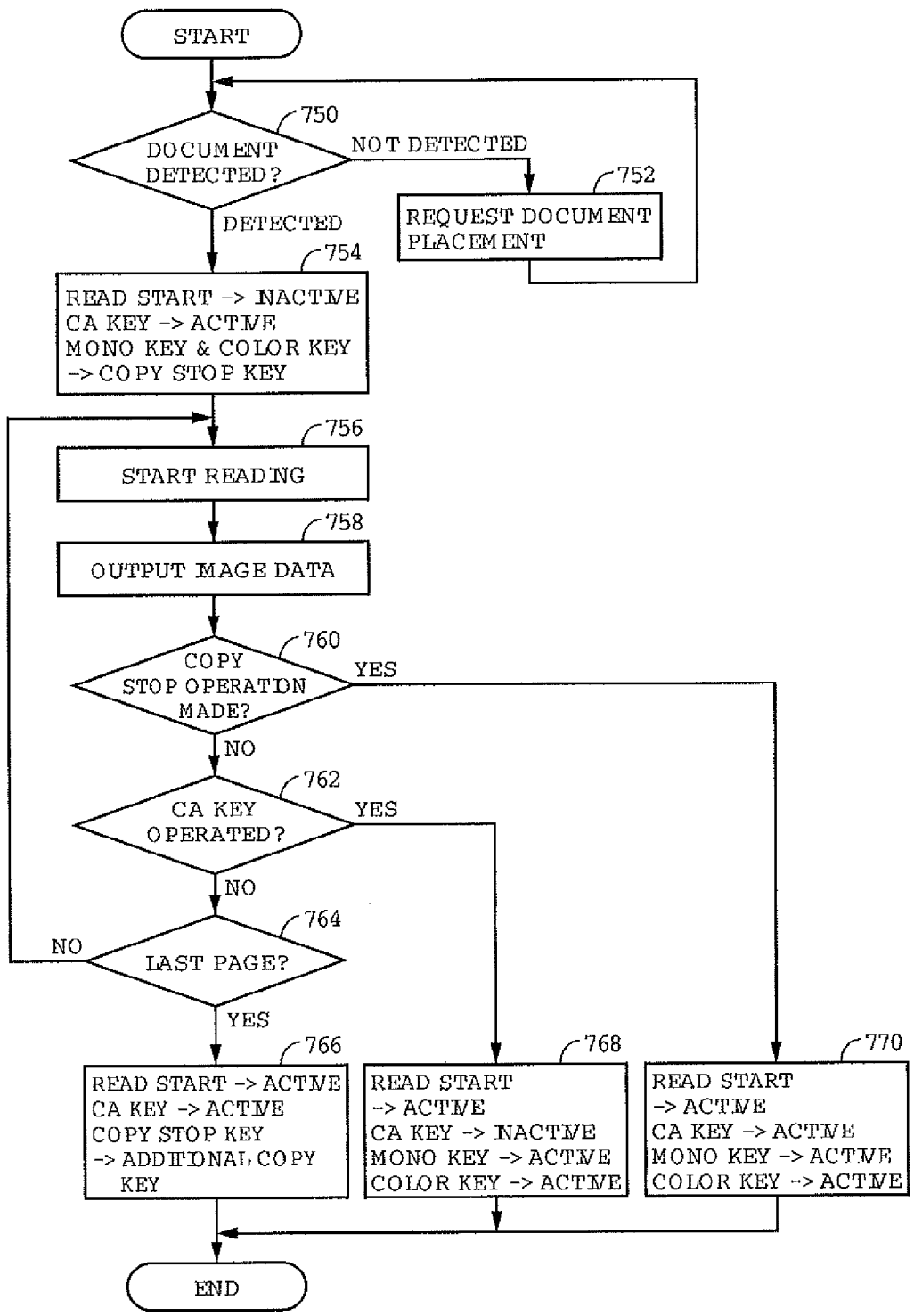
FIG. 14 is a flowchart of a program for the copy process, realizing the display transition of the task trigger area shown in FIG. 13, in the image forming apparatus shown in FIG. 1.

Referring to FIG. 14, the program starts when the user presses monochrome copy start key 604 or color copy start key 606 shown in FIG. 13. First, at step 750, whether or not there is any document in the tray portion of document reading unit is detected. If any document is detected, the control proceeds to step 754, and if not, the control proceeds to step 752. At step 752, a message asking the user to place a document on the tray is displayed, and the control returns to step 750.

At step 754, the display of task trigger area makes a transition to such a state as shown at the center of FIG. 13. Specifically, read start key 600 becomes inactive and grayed-out. Clear-all key 602 becomes active. Monochrome copy start key 604 and color copy start key 606 become invisible on the screen image, while copy stop key 630 is displayed at a position and in a size being superposed on these keys. Thereafter, the control proceeds to step 756. At step 756, reading of one page of the document is executed. At step 758, the read image is output on a sheet of recording paper. If execution of the program has been started by pressing monochrome copy start key 604, the image formed at step 758 is a black-and-white image. If execution of the program has been started by pressing color copy start key 606, the image formed at step 758 is a color image.

Thereafter, at step 760, whether or not an operation to stop copying has been made is determined. Specifically, whether or not copy stop key 630 displayed at the center of FIG. 13 has been pressed is determined. If the determination is positive, the control proceeds to step 770. At step 770, the document reading interruption process takes place, and then the control returns to step 700.

If the determination at step 760 is negative, the control proceeds to step 762. At step 762, whether or not clear-all key 602 is operated is determined.

If the determination at step 762 is positive, the control proceeds to step 768. At step 768, settings are all cleared, read start key 600 is activated, and clear-all key 602 is inactivated. Monochrome copy start key 604 and color copy start key 606 are both activated. If copy stop key 630 and additional copy key 640 should have been displayed, these are erased. Thereafter, execution of the program ends, and the control returns to the main routine.

If the determination at step 762 is negative, the control proceeds to step 764. At step 764, whether or not the copied page is the last page is determined. If the determination is negative, the control returns to step 756. If the determination at step 764 is positive, the control proceeds to step 766.

At step 766, read start key 600 that has been inactivated is activated, and clear-all key 602 is also activated. Copy stop key 630 is erased, and additional copy key 640 is displayed to be superposed on monochrome copy start key 604 and color copy start key 606 in a manner of display similar to those keys. After step 768, execution of the program ends, and the control returns to the main routine.

<<Facsimile Transmission>>

Figure 15:
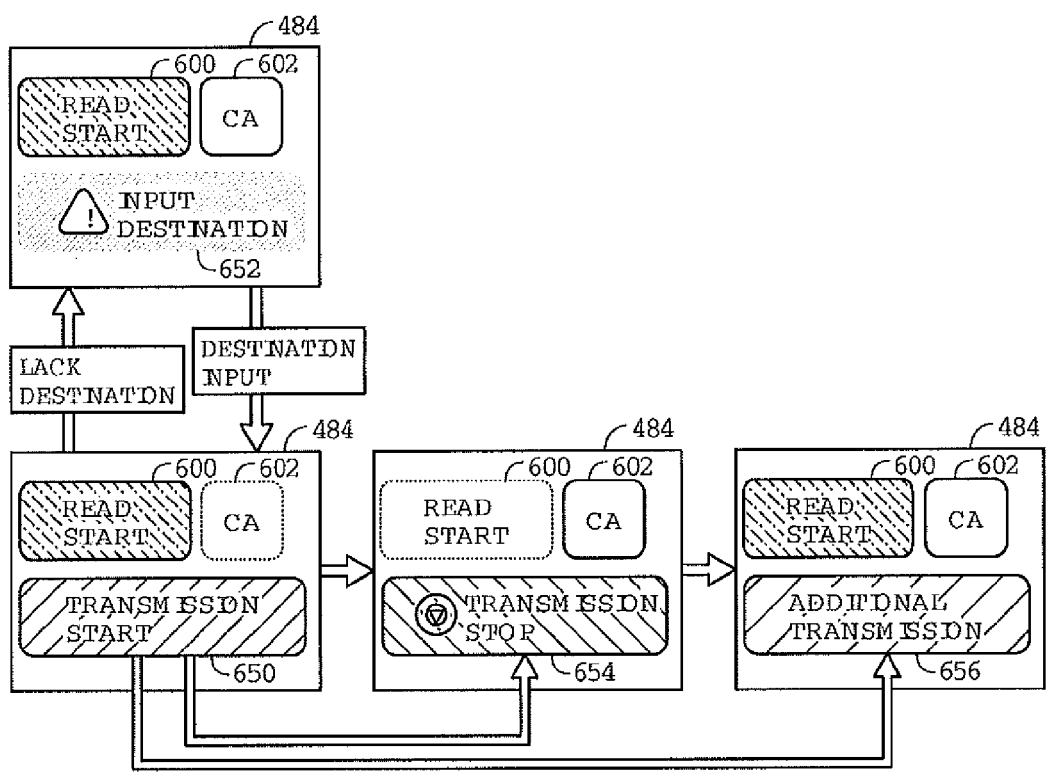
FIG. 15 shows display transitions of a task trigger area, when a facsimile transmission process is executed in the image forming apparatus shown in FIG. 1.

FIG. 15 illustrates display transition of task trigger area 484 at the time of facsimile transmission. Referring to the lower left side of FIG. 15, at the start of facsimile transmission, on task trigger area 484, read start key 600, clear-all key 602 and transmission start key 650 are displayed. As in FIG. 10, clear-all key 602 is grayed-out.

When the user operates transmission start key 650, facsimile transmission starts. Before actually starting transmission, whether or not a valid destination has been input is determined. If a valid destination is not input, the display on task trigger area 484 changes to the state shown on the upper left side of FIG. 15. Specifically, in place of transmission start key 650, a destination input key 652 as a message asking input of an appropriate destination is displayed at the same position, in the same shape and in the same size as transmission start key 650. Transmission start key 650 is inactivated. Therefore, facsimile transmission temporarily becomes impossible.

When the user inputs a valid destination, destination input key is erased, and transmission start key 650 is activated as shown on the lower left side of FIG. 15.

Assume that a valid destination has been designated and the user presses transmission start key 650. As shown at the center of FIG. 15, read start key becomes inoperable and grayed-out. Transmission start key 650 is inactivated, and in place of transmission start key 650, a transmission stop key 654 is displayed, at the same position in the same shape. Transmission stop key 654 is to stop facsimile transmission, and this is a function opposite to the function of transmission start key 650. Therefore, in the present embodiment, transmission stop key 654 is displayed in the display manner similar to that of transmission start key 650.

When facsimile transmission ends, read start key 600 again becomes operable, as shown on the lower right side of FIG. 15. Transmission stop key 654 is erased, and in place of transmission stop key 654, an additional transmission key 656 is displayed at the same position and in the same shape. Additional transmission key 656 is a key to be operated when additional document is to be transmitted to the same destination as the immediately preceding facsimile transmission. Namely, the function of additional transmission key 656 is different from but similar to the function of transmission start key 650. Therefore, in the present embodiment, additional transmission key 656 is displayed in the display manner similar to that of transmission start key 650.

<<Program Structure Realizing Facsimile Transmission Process>>

Referring to FIG. 16, the program realizing the display transition of task trigger area 484 in facsimile transmission shown in FIG. 15 has the following control structure. First, whether or not the transmission start key has been pressed is determined (step 900). If the determination is negative, at step 920, a transmission condition setting process is executed, and thereafter, step 900 is repeated.

If the determination at step 900 is positive, at step 902 whether or not a valid destination has been set is determined. If the determination is positive, the control proceeds to step 904, and if it is negative, the control proceeds to step 922.

At step 922, task trigger area 484 makes a transition from the state on the lower left to the upper left side of FIG. 15. Specifically, read start key 600 is activated. Clear-all key 602 is also activated. In place of transmission start key 650, destination input key is displayed at the same position in the same size. Thereafter, at step 924, destination is set by the user. At step 926, whether or not a valid destination has been input is determined, and steps 924 and 926 are repeated until a valid destination is input. If a valid destination is input, at step 928, destination input key is erased, and transmission start key 650 is displayed. Thus, task trigger area 484 is displayed in the manner as shown on the lower left side of FIG. 15. Thereafter, the control returns to step 900.

On the other hand, if the determination at step 902 is positive, at step 903, read start key 600 is inactivated. Clear-all key 602 is activated. Transmission stop key 654 is displayed being superposed on transmission start key, at the same position and in the same size. Thereafter, at step 904, reading of the document to be transmitted starts. The read image is facsimile-transmitted at step 906 to the transmission destination. At the following step 908, whether or not transmission stop key 654 has been operated is determined. If the determination is positive, the control proceeds to step 916, and otherwise, the control proceeds to step 910.

At step 916, the read interruption process is executed, and execution of the program ends.

At step 910, whether or not clear-all key 602 has been operated is determined. If the determination is positive, the control proceeds to step 918, and otherwise, the control proceeds to step 912.

At step 918, a read clearing process is executed, and execution of the program ends.

On the other hand, at step 912, whether or not the image read at step 904 is the last document image is determined. If the determination is positive, the control proceeds to step 914, and otherwise, the control proceeds to step 904, at which reading of the next document is executed. At step 914, read start key is activated. Clear-all key 602 is activated. Transmission stop key 654 is erased, and in place of this key, additional transmission key 656 is displayed at the same position and in the same size as transmission stop key 654, and execution of the program ends.

[Operation]

Image forming apparatus 100 operates in the following manner. In the following, only the portions related to the display transition of task trigger area 484 will be described.

<<Document Reading>>

Referring to FIG. 10, on task trigger area 484, read start key 600, clear-all key 602, monochrome copy start key 604 and color copy start key 606 are displayed. Of these, clear-all key 602 is inactive and grayed-out.

Assume that the user places a document on a document tray of document reading unit 102 and presses read start key 600. Execution of the program shown in FIG. 11 starts. The determination at step 700 is positive. At step 704, read stop key 610 is displayed in place of read start key 600, and clear-all key 602 is activated. Monochrome copy start key 604 and color copy start key 606 are kept unchanged. Read stop key 610 is displayed in a display manner similar to read start key 600. Since read stop key 610 is displayed in place of read start key 600 in the similar display manner as read start key 600 as described above, it is possible for the user to easily understand that the function of read stop key 610 relates to the function of read start key 600. Therefore, if the user wishes to stop reading of the document by some reason, the user can immediately execute the stopping operation.

At step 706, an image of one page of the document is read, and at step 708, it is stored in HDD 302. If the user does not operate read stop key 610 or clear-all key 602, the process of steps 706, 708, 710, 712 and 714 are repeated until the last page. When all pages of the document are read, determination at step 714 becomes positive. At step 716, additional read key 612 is displayed, in place of read stop key 610. Clear-all key 602, monochrome copy start key 604 and color copy start key 606 are activated. Additional read key 612 is displayed in the same display manner as read start key 600. Therefore, it is possible for the user to easily understand that the function of additional read key 612 is related to the function of read start key 600. If additional reading is desired, the user can take necessary process step (operation of additional read key) immediately.

Thereafter, if the user operates additional read key 612, through the path of steps 722, 730 and 736 shown in Fig, 14, at step 738, read stop key 610 is displayed in place of additional read key 612. Clear-all key 602 is activated. Monochrome copy start key 604 and color copy start key 606 are also activated. As a result, the overall display of task trigger area 484 is as shown at the center of FIG. 10.

Monochrome Printing

Figure 12:
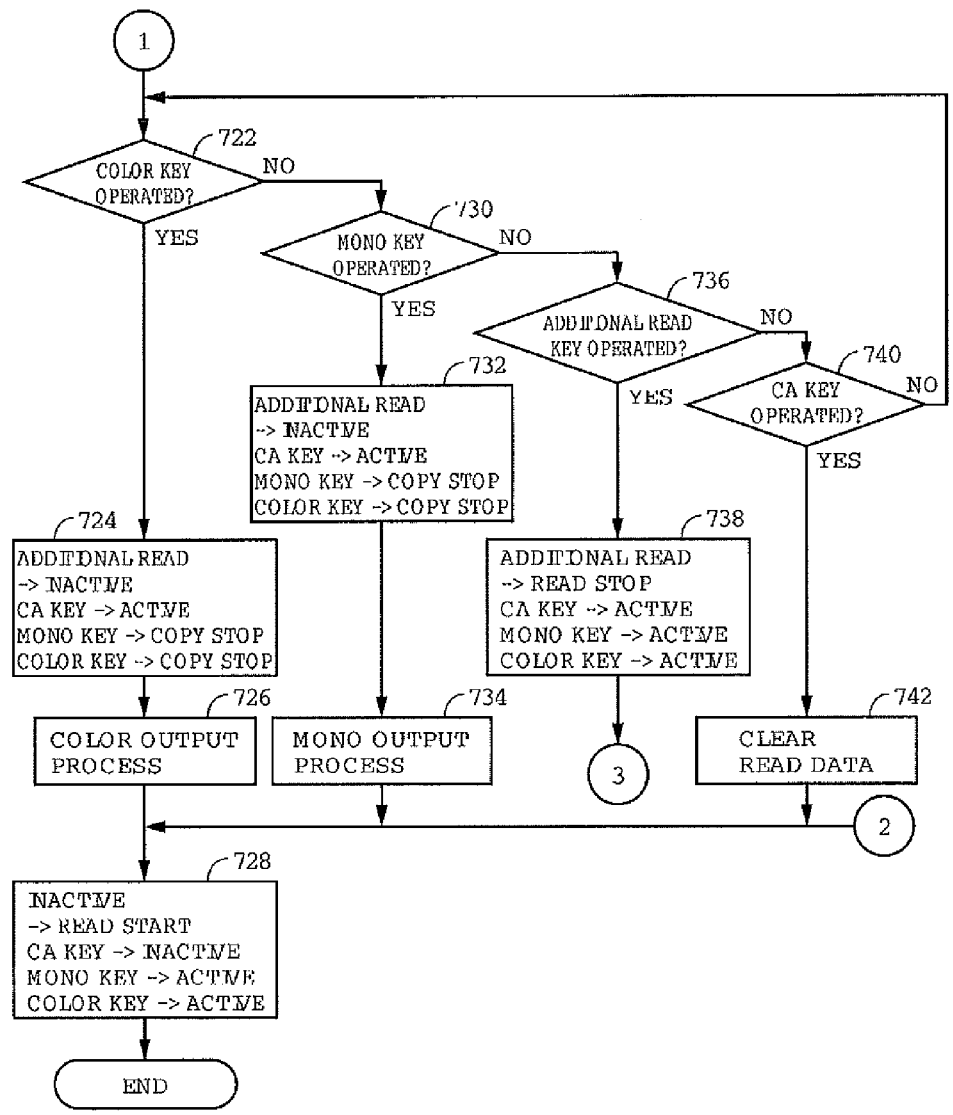

By the time a series of document reading operations has been completed, the display of task trigger area 484 is in the state shown on the right side of FIG. 10 (step 716 of Fig, 11). Assume that the user presses monochrome copy start key 604 here. Then, through steps 722 and 730 of FIG. 12, additional read key 612 is inactivated at step 732. Clear-all key 602 is activated. In place of monochrome copy start key 604 and color copy start key 606, copy stop key 630, which is the same as that shown at the center of FIG. 13, is displayed. Monochrome copy start key 604 and color copy start key 606 are not displayed on the screen image. Thereafter, at step 734, the process for outputting the document images read by that time in black and white is executed. Further, at step 728, read start key 600 is displayed, clear-all key is activated, and monochrome copy start key 604 and color copy start key 606 are activated. As a result, the display of task trigger area 484 returns to the state shown on the left side of FIG. 10. Copy stop key 630, which is the same as that shown at the center of FIG. 13, is displayed at the same position as monochrome copy start key 604 and color copy start key 606, to be superposed thereon. Therefore, if it becomes necessary to stop output, the user can immediately take a necessary process step (operation of copy stop key 630) for that purpose.

Color Printing

On the other hand, by the time a series of document reading operations has been completed, the display of task trigger area 484 is in the state shown on the right side of FIG. 10 (step 716 of FIG. 11), assume that the user presses color copy start key 606. Then, the control proceeds from step 722 to step 724 of FIG. 12. At step 724, additional read key 612 is inactivated. Clear-all key 602 is activated. In place of monochrome copy start key 604 and color copy start key 606, copy stop key 630, which is the same as that shown at the center of FIG. 13, is displayed. Therefore, as in the case where monochrome copy start key 604 is pressed, if it becomes necessary to stop output, the user can immediately take a necessary process step (operation of copy stop key 630) for that purpose.

In the document reading process, when monochrome copy start key 604 or color copy start key 606 is operated, the display of task trigger area 484 returns to the state shown on the left side of FIG. 10. Specifically, if clear-all key 602 is operated, monochrome copy start key 604 is operated or color copy start key 606 is operated, additional read key 612 that has been displayed on task trigger area 484 is erased, and read start key 600 is displayed. On the contrary, if these keys are not operated, additional read key 612 is not erased. Here, these keys may be regarded as keys for cancelling the state that allows additional reading. Such an approach is also advantageous in that user confusion caused by sudden disappearance of additional read key can be prevented.

<<Copy Process>>

The transition of task trigger area 484 during the copy process is as shown in FIG. 13. In the copy initial screen image, task trigger area 484 is in the state shown on the left side of FIG. 13. Here, assume that the user places a document on a tray of document reading unit 102. At this time point, the program having the control structure shown in FIG. 7 is executed. If necessary paper is not loaded in paper cassette 240 (NO at step 540), task trigger area 484 makes a transition to the sate shown at the center of FIG. 6, by the process of step 544. Paper-out hinders image formation. Therefore, the copy process cannot be started. Since paper-out key 608 is displayed at the same position as monochrome copy start key 604 and color copy start key 606, the user can immediately recognize that loading of paper is necessary. When the user loads paper, the determination at step 540 of FIG. 7 becomes positive, and the process of step 542 is executed. As a result, the display of task trigger area 484 returns to the state shown on the right side of FIG. 6, and if the toner is not in short supply, copying becomes possible.

If the toner is out, the program having the control structure shown in FIG. 9 is executed.

Referring to FIG. 9, if black toner and color toner are both out, the display of task trigger area 484 such as shown on the lower right side of FIG. 8 is realized through the path of steps 560, 568 and 572. Since black-toner-out key 624 and color-toner-out key 622 are displayed at the same position and in the same size as monochrome copy start key 604 and color copy start key 606, it is possible for the user to immediately understand that replenishment of black toner and color toner is necessary.

If black toner is out but color toner is available, the display shown on the upper right side of FIG. 8 is realized through the path of steps 560, 568 and 670 of FIG. 9. Here, black-toner-out key 620 is displayed at the same position as monochrome copy start key 604 and color copy start key 606 in a size covering these keys. Therefore, it is possible for the user to immediately understand that replenishment of black toner is necessary.

If color toner is out but black toner is available, the display of task trigger area shown on the lower left side of FIG. 8 is realized through the path of steps 560, 562 and 564 of FIG. 9. In place of color copy start key 606, color-toner-out key 622 is displayed at the same position, in the same size and in the same shape. Therefore, it is possible for the user to immediately understand that replenishment of color toner is necessary.

If black toner and color toner are both available, the display of task trigger area 484 shown on the upper left side of FIG. 8 is realized through the path of steps 560, 562 and 566 of FIG. 9. Since monochrome copy start key 604 and color copy start key 606 are both displayed, it is possible for the user to easily understand that both copying operations can be executed.

If copying is possible, here, the user operates monochrome copy start key 604 or color copy start key 606. Then, the display of task trigger area 484 changes to the state shown at the center of FIG. 13. Specifically, copy stop key 630 is displayed at the same position as monochrome copy start key 604 or color copy start key 606 and being superposed on these keys (steps 750 and 754 of FIG. 14). Therefore, if it becomes necessary to stop copying by some reason, the user can readily understand that he/she should press copy stop key 630, and the operation can immediately be stopped. When the user operates copy stop key 630, the determination of step 760 of FIG. 14 becomes YES, and the copy stopping operation is executed at step 770. The same applies when clear-all key 602 is operated (steps 762 and 764). It is noted, however, that if clear-all key 602 is operated, all settings of image forming apparatus 100 are cleared.

If copy stop key 630 is not operated, the process of steps 756, 758, 760 and 762 of FIG. 14 is repeated for the number of times corresponding to the number of pages of the document. When the image of last page of the document is read, the determination at step 764 becomes positive, and the control proceeds to step 766. At step 766, read start key 600 is activated. Clear-all key 602 is also activated. In place of read stop key 610 shown at the center of FIG. 13, additional copy key 640 shown on the right side of FIG. 13 is displayed. As a result, the state of task trigger area 484 is changed to the state shown on the right side of FIG. 13.

Referring to the right side of FIG. 13, additional copy key 640 is displayed approximately at the same position as the area of monochrome copy start key 604 or color copy start key 606, to cover these keys. Therefore, if an additional copy is necessary, the user can immediately execute the necessary process (operation of additional copy key 640).

<<Facsimile Transmission>>

In facsimile transmission, the initial state of task trigger area 484 is as shown on the lower left side of FIG. 15. Assume that the user places a document on image forming apparatus 100 and operates transmission start key 650. If a valid destination is not set (NO at step 902 of FIG. 16), the display of task trigger area 484 changes to that shown on the upper left side of FIG. 15 (step 922). In place of transmission start key 650, destination input key 652 is displayed at the same position and in the same size. Therefore, the user can easily understand that the destination should be input. When the user inputs a valid destination (YES at step 926), the display of task trigger area 484 returns to the state shown on the lower left side of FIG. 15 (step 928).

Here, when the user presses transmission start key 650, the determinations at steps 900 and 902 of FIG. 16 become YES, and the process of steps 904 to 912 is executed. Transmission stop key 654 is displayed at the same position and in the same size as transmission start key 650 (step 903) and, therefore, if it becomes necessary to stop facsimile transmission by some reason, the user can immediately operate transmission stop key 654.

As described above, in the image forming apparatus 100 in accordance with the present embodiment, when a key (button) issuing an instruction to start any process is operated, another key instructing another process related to but different from the started process (such as interruption or stopping of the started process) is displayed at the same position as the key (button). The said another key is displayed in uniform manner in the same color (for example, in red). As a result, the user can immediately make a necessary operation related to the process he/she has instructed to start. If the process instructed to be started cannot be executed by some reason, a message related to the cause or solution is displayed at the same position in substantially the same display manner (color, shape, design etc.) as the key (button) for giving the instruction. The message displayed at this time (toner-out, paper-out, destination not input) is displayed in a uniform manner in the same color (for example, in orange). As a result, necessary process can be done before starting the intended process, and thus, smooth processing can be realized.

In the embodiment above, an example has been described in which paper-out is displayed in task trigger area 484. The event to be displayed on task trigger area 484 is not limited to the above. By way of example, a similar display may be realized for paper jam during copying.

In the embodiment above, on monochrome copy start key 604 and color copy start key 606, black-toner-out key 624 and color-toner-out key 622 and the like are displayed. Further, black-toner-out key 624 and color-toner-out key 622 are semi-transparent and, therefore, the user can recognize over which keys these keys are displayed. The present invention, however, is not limited to such an embodiment, and black-toner-out key 624 and color-toner-out key 622 may be non-transparent.

In the embodiment above, by way of example, if the black toner is out and color toner is available, copying is impossible. Black, however, can be represented by the color toner and, therefore, color copy start key 606 may be active even if the black toner is out.

In the embodiment above, software keys have been described as examples. The present invention, however, is not limited to such an embodiment, and it is clear to those skilled in the art that the present invention is generally applicable to any UI component that can be used as a trigger of a process.

The embodiments as have been described here are mere examples and should not be interpreted as restrictive, The scope of the present invention is determined by each of the claims with appropriate consideration of the written description of the embodiments and embraces modifications within the meaning of, and equivalent to, the languages in the claims.

What is claimed is:

1. A display operation device, comprising: a display-integrated operation panel having a display screen; a first UI component display device displaying a first user interface (UI) component image on said display screen; a process activating device, responsive to a user operation of said first UI component displayed on said display screen by said first UI component display device, for activating a process associated with the first UI component; and a second UI component display device, responsive to occurrence of a predetermined condition related to the process activated in association with said first UI component by said process activating device, for displaying a second UI component on said display screen; wherein said second UI component is displayed at a position of display of said first UI component, to cover said first UI component;

wherein said second UI component display device includes a disabling device, detecting occurrence of an event hindering the process to be activated by said process activating device, for displaying said second UI component at the same position as said first UI component, to be superposed on said first UI component, and thereby for disabling user operation of said first UI component;

said display operation device mounted on an image processing apparatus involving toner use, wherein said first UI component is a device for displaying an image formation start key for activating a process for forming an image using the toner; and said disabling device includes a toner-out detecting device detecting shortage of toner to be used for image formation by said image forming apparatus, and a replenishment message display device, responsive to detection of toner-out by said toner-out detecting device, for displaying a message asking replenishment of toner, as said second UI component;

wherein said toner-out detecting device includes a device for separately detecting black-toner-out and color-toner-out; and said replenishment message display device includes a toner-by-toner message display device, responsive to detection of one of or both of black-toner-out and color-toner-out by said toner-out detecting device, for displaying a message asking replenishment of black toner, replenishment of color toner or replenishment of black toner and color toner, as said second UI component;

and wherein said first UI component includes a first key instructing start of image formation using black toner, and a second key instructing start of image formation using color toner; and said toner-by-toner message display device displays a key including the message asking replenishment of toner, on said first key if black-toner-out is detected and on said second key if color-toner-out is detected.

2. The display operation device according to claim 1, wherein said second UI component display device includes a device responsive to activation of a process associated with said first UI component by said process activating device, for displaying said second UI component at the position of said first UI component on said display screen; said operation display device further comprising stopping device, responsive to a user operation of said second UI component, for stopping execution of the process activated by said process activating device.

3. The display operation device according to claim 1, mounted on an image processing apparatus involving use of a recording medium, wherein said first UI component display device is a device for displaying an image formation start key for activating a process for image formation on the recording medium; and said disabling device includes a trouble detecting device detecting a trouble occurring in relation to supply of the recording medium of said image processing apparatus, and a trouble-solution message display device, responsive to detection of a trouble by said trouble detecting device, for displaying a message asking a solution to the problem, as said second UI component.

4. The display operation device according to claim 3, wherein said image formation start key includes first and second keys for instructing image formation using black toner and color toner, respectively, on the recording medium; and said second UI component is displayed to cover both said first and second keys.

5. The display operation device according to claim 1, mounted on an image processing apparatus transmitting image data through a communication device, wherein said first UI component display device is a device for displaying an image transmission start button for activating a process for transmitting an image to a designated destination; and said disabling device includes a trouble detecting device for detecting failure of designating an appropriate destination when an image is to be transmitted by said image processing apparatus, and a destination input message display device, responsive to detection of a trouble by said trouble detecting device, for displaying a message asking input of an appropriate destination of the image, as said second UI component, superposed on said image transmission start key.

6. The display operation device according to claim 1, wherein said first UI component includes a plurality of components; and said second UI component is displayed in a color different from said first UI components, and displayed in the same color no matter on which of said first UI components the second UI component is displayed.

7. The display operation device according to claim 1, wherein outline form of said second UI component matches outline form of said first UI component.

8. The display operation device according to claim 1, wherein said second UI component is displayed in a transparent manner to allow recognition of a key displayed on a lower layer of said second UI component.

9. The display operation device according to claim 1, further comprising a disabling device, detecting occurrence of an event hindering the process to be activated by said process activating device, for displaying a third UI component at the same position as said first UI component, to be superposed on said first UI component, and thereby for disabling user operation of said first UI component.

10. The display operation device according to claim 9, wherein said second UI component is displayed in a first color, and said third UI component is displayed in a second color different from said first color.

11. The display operation device according to claim 9, wherein said first UI component includes a plurality of components; said second UI component is displayed in a first display color no matter on which of said plurality of first UI components the second UI component is displayed; and said third UI component is displayed in the second color different from said first color, no matter on which of said plurality of first UI components the third UI component is displayed.

12. An image processing apparatus, comprising: the display operation device according to claim 1; an image forming device forming image data; and an image processing unit, connected to said display operation device and said image forming device, for processing the image data formed by said image forming device, based on an output instruction from said display operation device.

13. A method of receiving a user operation using a display-integrated operation panel having a display screen, comprising the steps of: displaying an image of a first UI component on said display screen; activating, in response to a user operation of said first UI component displayed on said display screen at said step of displaying the image of said first UI component, a process associated with said first UI component; and displaying, in response to occurrence of a predetermined condition related to the process activated at said step of activating a process, a second UI component on said display screen; wherein said second UI component is displayed at a display position of said first UI component to cover said first UI component;

wherein said second UI component includes a disabling device, detecting occurrence of an event hindering the process to be activated by said process activating device, for displaying said second UI component at the same position as said first UI component, to be superposed on said first UI component, and thereby for disabling user operation of said first UI component;

the display-integrated operation panel mounted on an image processing apparatus involving toner use, wherein said first UI component is a device for displaying an image formation start key for activating a process for forming an image using the toner; and said disabling device includes a toner-out detecting device detecting shortage of toner to be used for image formation by said image forming apparatus, and a replenishment message display device, responsive to detection of toner-out by said toner-out detecting device, for displaying a message asking replenishment of toner, as said second UI component;

wherein said toner-out detecting device includes a device for separately detecting black-toner-out and color-toner-out; and said replenishment message display device includes a toner-by-toner message display device, responsive to detection of one of or both of black-toner-out and color-toner-out by said toner-out detecting device, for displaying a message asking replenishment of black toner, replenishment of color toner or replenishment of black toner and color toner, as said second UI component;

and wherein said first UI component includes a first key instructing start of image formation using black toner, and a second key instructing start of image formation using color toner; and said toner-by-toner message display device displays a key including the message asking replenishment of toner, on said first key if black-toner-out is detected and on said second key if color-toner-out is detected.

* * * * *